United States Patent
Cui et al.

(10) Patent No.: US 12,520,193 B2
(45) Date of Patent: Jan. 6, 2026

(54) EXTENDED, OPEN NETWORK ARCHITECTURES SUPPORTING DELIVERY OF NETWORK-ACCESSIBLE SERVICES

(71) Applicant: AT&T Intellectual Property I, L.P., Atlanta, GA (US)

(72) Inventors: Zhi Cui, Sugar Hill, GA (US); Paul Edward Smith, Jr., Heath, TX (US); David Kinsey, Carnation, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 815 days.

(21) Appl. No.: 17/887,867

(22) Filed: Aug. 15, 2022

(65) Prior Publication Data

US 2024/0056886 A1 Feb. 15, 2024

(51) Int. Cl.
*H04W 28/20* (2009.01)
*H04W 28/08* (2023.01)
*H04W 28/24* (2009.01)

(52) U.S. Cl.
CPC ... *H04W 28/0908* (2020.05); *H04W 28/0925* (2020.05); *H04W 28/24* (2013.01)

(58) Field of Classification Search
USPC ........................................................ 370/329
See application file for complete search history.

(56) References Cited

U.S. PATENT DOCUMENTS

| 6,195,689 B1* | 2/2001 | Bahlmann | H04L 41/0806 709/217 |
| 9,722,857 B2* | 8/2017 | Liu | H04L 41/0895 |
| 11,659,401 B1* | 5/2023 | Montalvo | H04W 28/0925 455/452.1 |

(Continued)

OTHER PUBLICATIONS

Near-RT RIC: Architecuture, Operations, and Benchmarking, IEEE Infocom, 2023 (Year: 2023).*

(Continued)

*Primary Examiner* — Chirag G Shah
*Assistant Examiner* — Majid Esmaeilian
(74) *Attorney, Agent, or Firm* — Guntin & Gust, PLC; Ralph Trementozzi

(57) ABSTRACT

Aspects of the subject disclosure may include, for example, determining a requirement of a network-accessible service requested by a user, and determining a network policy according to the service. An infrastructure of a network domain is organized according to the requirement and the policy to provide the service. A distributed controller operating within the network domain configures time-insensitive and time sensitive network domain functions according to the network policy. The time-insensitive functions are obtained from the distributed controller and applied in a manner that selects an access domain type of a number of different types. The selection is made according to an application of the time-insensitive and time sensitive network domain functions. Network performance data is monitored, and the infrastructure is reconfigured responsive to the application the functions, to obtain a reconfigured network infrastructure based on the network performance data, to ensure compliance with the network policy. Other embodiments are disclosed.

20 Claims, 9 Drawing Sheets

(56) References Cited

U.S. PATENT DOCUMENTS

| | | | |
|---|---|---|---|
| 11,765,623 B1* | 9/2023 | Cai | H04W 28/24 370/229 |
| 11,843,953 B1* | 12/2023 | Montalvo | H04W 72/0453 |
| 2020/0045519 A1* | 2/2020 | Raleigh | H04W 4/08 |
| 2020/0106536 A1 | 4/2020 | Bedekar | |
| 2021/0184989 A1* | 6/2021 | Wu | H04L 47/762 |
| 2021/0258866 A1 | 8/2021 | Chou | |
| 2021/0258969 A1 | 8/2021 | Yang et al. | |
| 2021/0337420 A1* | 10/2021 | Lo | H04L 41/0806 |
| 2021/0377803 A1* | 12/2021 | Huang | H04W 28/0925 |
| 2021/0385159 A1* | 12/2021 | Mehmedagic | H04L 41/0895 |
| 2022/0014512 A1* | 1/2022 | Raleigh | H04L 63/20 |
| 2022/0014963 A1 | 1/2022 | Yeh et al. | |
| 2022/0116334 A1 | 4/2022 | Zhu et al. | |
| 2022/0116799 A1 | 4/2022 | Wang et al. | |
| 2022/0124543 A1* | 4/2022 | Orhan | G06N 3/08 |
| 2022/0124588 A1 | 4/2022 | Zhu et al. | |
| 2022/0158897 A1 | 5/2022 | Chou et al. | |
| 2022/0166692 A1* | 5/2022 | Burton | H04L 43/0817 |
| 2022/0167236 A1* | 5/2022 | Melodia | H04W 28/24 |
| 2022/0232423 A1 | 7/2022 | Thyagaturu et al. | |
| 2022/0279535 A1* | 9/2022 | Tsui | H04L 5/14 |
| 2023/0019773 A1* | 1/2023 | Raymond | H04W 40/02 |
| 2023/0136319 A1* | 5/2023 | Logan | H04W 48/16 455/411 |
| 2023/0308959 A1* | 9/2023 | Shankaranarayanan | H04W 36/08 |
| 2023/0403543 A1* | 12/2023 | Pateromichelakis | H04W 24/02 |
| 2024/0073109 A1* | 2/2024 | Vaishnavi | H04L 41/5058 |
| 2024/0098568 A1* | 3/2024 | Curic | H04W 28/0925 |
| 2024/0250879 A1* | 7/2024 | Forenza | H04L 41/0894 |
| 2024/0259879 A1* | 8/2024 | Ranganath | H04L 41/5054 |
| 2025/0016808 A1* | 1/2025 | Grinshpun | H04W 28/24 |
| 2025/0106694 A1* | 3/2025 | Yang | H04W 24/02 |
| 2025/0211628 A1* | 6/2025 | Zhang | H04L 65/1045 |
| 2025/0212063 A1* | 6/2025 | Tahir | H04W 28/24 |
| 2025/0234231 A1* | 7/2025 | Hannák | H04W 24/02 |

OTHER PUBLICATIONS

Near-RT RIC Architecture, Operations (Year: 2023).*

"Open RAN 101-Role of RAN Intelligent Controller: Why, what, when, how? (Reader Forum)", RCR Wireless News, https://www.rcrwireless.com/20200730/opinion/readerforum/open-ran-101-role-of-ran-intelligent-controller-why-what-when-how-reader-forum, 12 pp., Jul. 30, 2020.

"O-RAN: Towards an Open and Smart RAN", O-RAN Alliance, White Paper, 19 pp., 2018.

"RAN intelligent controller", RAN intelligent controller—Wiki I Golden, https://golden.com/wiki/RAN_intelligent_controller-DZ559B5, 5 pp., Jun. 2, 2022.

"What is CU and DU in 5G?", 5GWorldPro.com, https://www.5gworldpro.com/5g-knowledge/what-is-cu-and-du-in-5g.html, 3 pp., Jan. 25, 2022.

Cohen, Peter , "xApps vs. rApps: Network automation fundamentals", https://www.rcrwireless.com/20211122/open_ran/what-is-an-xapp-network-automation-fundamentals, 3 pp., Nov. 23, 2021.

Nezami, Yashar et al., "What is the metaverse and why does it need SG to succeed? The metaverse SG relationship explained", Why the metaverse-5G relationship is fundamental—Ericsson Blog, https://www.ericsson.com/en/blog/2022/4/why-metaverse-needs-5g, 17 pp., Apr. 21, 2022.

* cited by examiner

EXTENDED, OPEN NETWORK ARCHITECTURES SUPPORTING DELIVERY OF NETWORK-ACCESSIBLE SERVICES

FIELD OF THE DISCLOSURE

The subject disclosure relates to extended, open network architectures supporting delivery of network-accessible services.

BACKGROUND

The radio access network (RAN) includes technology that connects end-user devices to a mobile network over a wireless domain. Although implementations of mobile services adhere to standards that ensure interoperability between mobile networks and user equipment, interoperability between and among network devices may be apply proprietary technologies. As a result, a network operator's choice in selecting network equipment vendors may be restricted by existing equipment . . . a so-called "vendor lock-in."

As a general trend, networks are becoming less reliant on specialized hardware as they move towards specialized software adapted to operate on more generalized equipment. Such "softwarization" offers greater flexibility to mobile networks operators (MNO), by simplifying management of network resources through virtualized network functions and/or software defined networks. In this regard, MNOs have undertaken initiatives to enable greater use of open interfaces as well as analytics and machine learning and real time analytics in the radio access network (RAN) in an effort to improve performance and automation of the network. For example, the Open-RAN Alliance, relates to a network architecture that employs a radio intelligent controller (RIC) adapted to aid in improving performance and automation.

The RIC may consist of a near-real time portion (RIC near-RT) and a non-real time portion (RIC-non-RT). Both of these might be used for machine learning systems, though the non-RT portion is assumed to operate over a longer period of time than does the near-RT portion, which is assumed to operate in close to real time. However, to achieve these objectives of performance and automation for different functions of the RAN, new algorithms and interactions are needed. The RIC near-RT and RIC non-RT can be viewed as platforms on which such new functions and algorithms can be hosted

BRIEF DESCRIPTION OF THE DRAWINGS

Reference will now be made to the accompanying drawings, which are not necessarily drawn to scale, and wherein.

DETAILED DESCRIPTION

Figure 1:
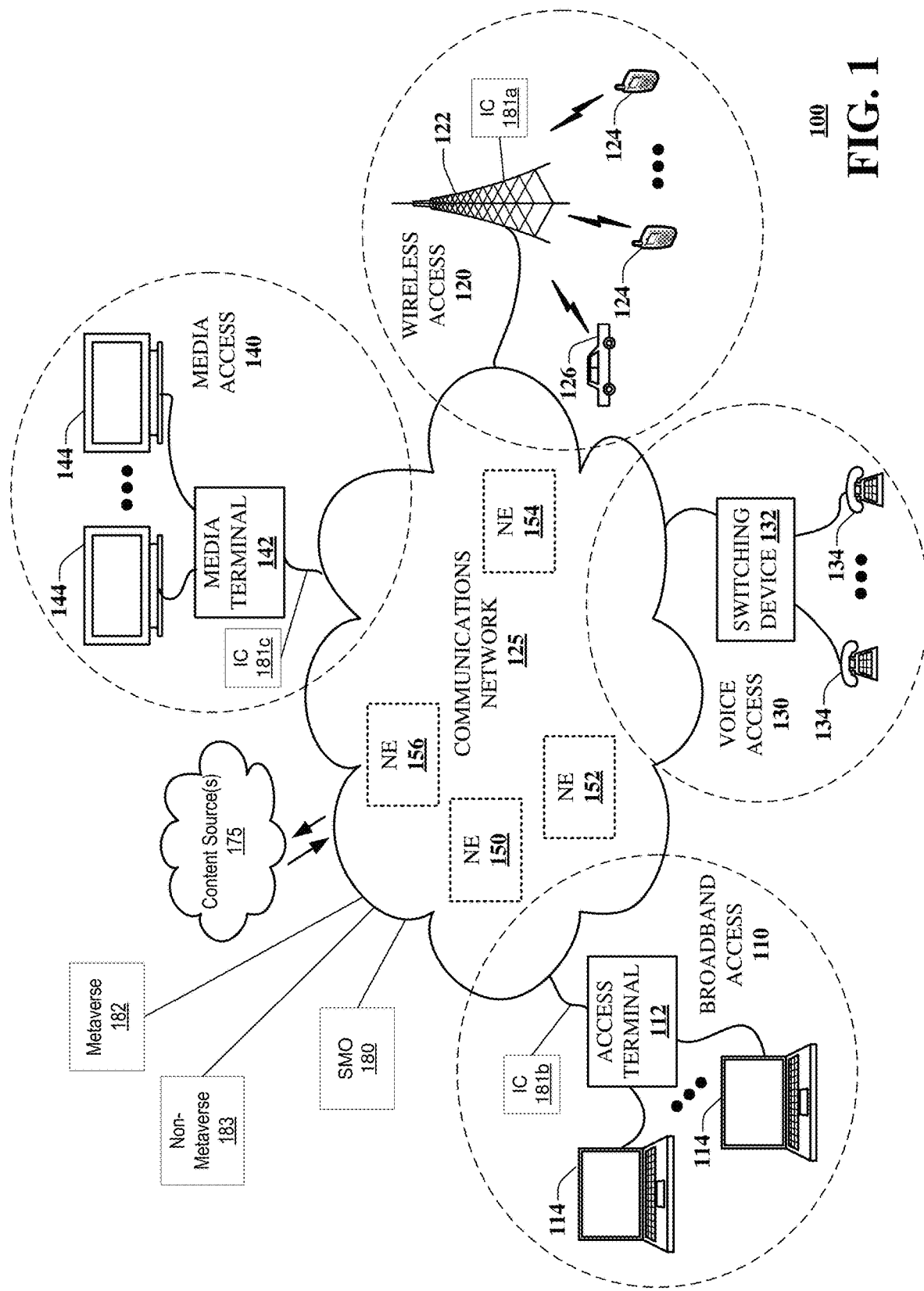
FIG. 1 is a block diagram illustrating an exemplary, non-limiting embodiment of a communications network in accordance with various aspects described herein.

The subject disclosure describes, among other things, illustrative embodiments that extend an open RAN architecture within the access domain and, in at least some embodiments, to other domains that cooperate to deliver network-accessible services to mobile subscribers. In at least some embodiments, some services, such as metaverse services, may be distinguished from other services, such as non-metaverse services. Such service distinctions may allow an open RAN architecture, including any extensions thereto, to facilitate a service-based management of network infrastructure, e.g., tailoring network optimization for a metaverse service differently from a non-metaverse service. Other embodiments are described in the subject disclosure.

One or more aspects of the subject disclosure include a system that includes a number of distributed domain controllers adapted to provide time sensitive control of network infrastructure of multiple distributed network domains to facilitate delivery of a plurality of network-accessible services to equipment of a group of end users, and a service manager in communication with the number of distributed domain controllers. The service manager includes a processing system including a processor and a memory that stores executable instructions. The instructions, when executed by the processing system, facilitate performance of operations that include identifying a service requirement of a network-accessible service of the number of network-accessible services requested by equipment of an end user of the number of end users. A network policy is identified according to the network-accessible service, and a configuration of a network infrastructure is coordinated of a first network domain adapted to serve the network-accessible service to the equipment of the end user according to the service requirement and the network policy. A first distributed domain controller of the number of distributed domain controllers operating within the first network domain configures a first group of time-insensitive network domain functions according to the network policy and a first group of time sensitive network domain functions according to the network policy. The first group of time-insensitive network domain functions is received from the first distributed domain controller, and the first group of time-insensitive network domain functions are executed. The first distributed domain controller executing the first group of time sensitive network domain functions at a network edge of the first network domain selects an access domain type of a number of different access domain types to obtain a first selected access domain type according to the executing the first group of time-insensitive network domain functions and the executing the first group of time sensitive network domain functions. Network performance data associated with a delivery of the network-accessible service to the equipment of the end user via the network infrastructure of the first network domain including the first selected access domain type is collected. The network infrastructure of the first network domain is reconfigured responsive to the executing the first group of time-insensitive network domain functions and the executing the first group of time sensitive network domain functions, to obtain a reconfigured network infrastructure of the first network domain, based on the network performance data, to ensure compliance with the network policy.

One or more aspects of the subject disclosure include a process that includes identifying, by a processing system including a processor, a service requirement of a network-accessible service of a group of network-accessible services, requested by equipment of an end user. According to the process, a network policy is identified, by the processing system, according to the network-accessible service and a network infrastructure is organized, by the processing system, of a first network domain adapted to serve the network-accessible service to the equipment of the end user according to the service requirement and the network policy. A first distributed domain controller of a plurality of distributed domain controllers operating within the first network domain configures a first plurality of time-insensitive network domain functions according to the network policy and a first plurality of time sensitive network domain functions according to the network policy, and the first plurality of time-insensitive network domain functions are obtained, by the processing system, from the first distributed domain controller. Further according to the process, the first plurality of time-insensitive network domain functions are hosted, by the processing system, wherein the first distributed domain controller hosting the first plurality of time sensitive network domain functions at a network edge of the first network domain selects an access domain type of a plurality of different access domain types to obtain a first selected access domain type according to a running of the first plurality of time-insensitive network domain functions and a running of the first plurality of time sensitive network domain functions. Network performance data associated with a delivery of the network-accessible service to the equipment of the end user via the network infrastructure of the first network domain including the first selected access domain type is monitored by the processing system. The network infrastructure of the first network domain is reconfigured responsive to the running of the first plurality of time-insensitive network domain functions and the running of the first plurality of time sensitive network domain functions, to obtain a reconfigured network infrastructure of the first network domain, based on the network performance data, to ensure compliance with the network policy.

One or more aspects of the subject disclosure include a non-transitory, machine-readable medium, including executable instructions that, when executed by a processing system including a processor, facilitate performance of operations. The operations include determining a service requirement of a network-accessible service of a group of network-accessible services, requested by equipment of an end user, and determining a network policy according to the network-accessible service. A network infrastructure of a first network domain adapted to serve the network-accessible service to the equipment of the end user is organized according to the service requirement and the network policy. A first distributed domain controller of a group of distributed domain controllers operating within the first network domain configures a first group of time-insensitive network domain functions according to the network policy and a first group of time sensitive network domain functions according to the network policy. The first group of time-insensitive network domain functions are obtained from the first distributed domain controller and applied, wherein the first distributed domain controller applying the first group of time sensitive network domain functions selects an access domain type of a number of different access domain types to obtain a first selected access domain type. The selection is made according to an application of the first group of time-insensitive network domain functions and an application of the first group of time sensitive network domain functions. Network performance data is obtained, the data being associated with a delivery of the network-accessible service to the equipment of the end user via the network infrastructure of the first network domain including the first selected access domain type. The network infrastructure of the first network domain is reconfigured responsive to the application of the first group of time-insensitive network domain functions and the application of the first group of time sensitive network domain functions, to obtain a reconfigured network infrastructure of the first network domain, based on the network performance data, to ensure compliance with the network policy.

Referring now to FIG. 1, a block diagram is shown illustrating an example, non-limiting embodiment of a system 100 in accordance with various aspects described herein. For example, system 100 can facilitate in whole or in part determining a requirement of a network-accessible service requested by a user along with a corresponding network policy and organizing a supporting network infrastructure according to the requirement and the policy. During a design phase, a distributed controller operating within the network domain configures time-insensitive and time sensitive network domain functions according to the network policy. The time-insensitive functions are obtained from the distributed controller and applied in a manner that selects an access domain type from among a number of different domain types. The selection is made according to an application of the time-insensitive and time sensitive network domain functions. During a runtime phase, network performance data is monitored, and the infrastructure is reconfigured responsive to the application the functions, to obtain a reconfigured network infrastructure based on the network performance data, to ensure compliance with the network policy.

In particular, a communications network 125 is presented for providing services within one or more of a broadband access domain 110, e.g., to a number of data terminals 114 via access terminal 112, a wireless access domain 120, e.g., to a number of mobile devices 124 and/or vehicle(s) 126 via a base station or access point 122, a voice access domain 130, e.g., to a number of telephony devices 134, via switching device 132 and/or a media access domain 140, e.g., to a number of audio/video display devices 144 via media terminal 142. In addition, the communication network 125 may be coupled to one or more content sources 175 of audio, video, graphics, text and/or other media. While the example broadband access domain 110, the wireless access domain 120, the voice access domain 130 and the media access domain 140 are shown separately, one or more of these forms of access may be combined to provide multiple access services to a single client device (e.g., the mobile devices 124 may receive media content via the media terminal 142, the data terminal 114 may be provided voice access via switching device 132, and so on).

The communications network 125 includes a plurality of network elements (NE) 150, 152, 154, 156, etc., for facilitating delivery of services via the broadband access domain 110, the wireless access domain 120, the voice access domain 130, the media access domain 140 and/or the distribution of content from one or more of the content sources 175. The communications network 125 may include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets, or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway, or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The example system 100 is configured to extend an open RAN architecture within the access network domain and, in at least some embodiments, to other domains that cooperate to support and/or otherwise deliver network-accessible services to end-user devices, such as mobile subscribers. In at least some embodiments, the system 100 includes a system management and orchestration (SMO) controller 180 in communication with intelligent controllers in one or more of the example domains 110, 120, 130, 140. For example, the SMO 180 may be configured to act cooperatively with one or more of a first intelligent domain controller 181a, which may be adapted for operation within the wireless access domain 120, a second intelligent domain controller 181b, which may be adapted for operation within the broadband access domain 110, and/or a third intelligent domain controller 181c, which may be adapted for operation within the media access domain 140. In at least some embodiments, a single SMO controller 180 may be adapted to act cooperatively with more than one of the intelligent domain controllers 181a, 181b, 181c, generally 181, as illustrated. Alternatively, or in addition, the system 100 may include multiple SMO controllers 180, with one or more of the intelligent domain controllers 181 acting cooperatively with a respective one of the SMO controller 180, e.g., a separate SMO controller for each intelligent domain controllers.

Similar to the open RAN architecture, the intelligent domain controllers 181 may be configured with one or more locally hosted and/or operated, time sensitive application programs, e.g., near-real time microservice applications, or xApps, while the SMO controller 180 may be configured with one or more locally hosted and/or operated time-insensitive application programs, e.g., non-real time microservice applications, or rApps. The application programs, Apps, may be adapted to configure respective communication infrastructure allocated to and/or operated with a respective one of the access domains 110, 120, 140. Such configuration may occur during a design time, in which the Apps may identify a preferred allocation, arrangement and/or configuration of network infrastructure. Alternatively, or in addition, such configuration may occur as a reconfiguration during runtime. In this instance, runtime may refer to a time occurring after an initial configuration and/or during operation of the access network 110, 120, 140 delivering one or more services to equipment of an end user.

By way of example, during a design time for the wireless access domain 120, the intelligent domain controller 181a alone or in combination with the SMO controller 180, may identify one or more a particular radio access terminal, e.g., an eNB and/or gNB, a channel or frequency allocation, an antenna-coverage sector, a radio power setting, a bandwidth, a resource block allocation, and the like, to provide one or more services to equipment of an end user, e.g., the mobile device 124. The Apps may be configured to establish initial configuration to ensure a service requirement is met, in view of a particular service and/or group of services requested by the mobile device 124. An example service requirement may include, without limitation, one or more parameters as may be established by a corresponding service level agreement (SLA), such as a minimum quality of service (QoS), bandwidth, latency, error rate, and the like.

One or more of the SMO controllers 180 and/or the intelligent domain controllers 181 may operate independently and/or in cooperation to monitor one or more network parameters as may relate to delivery of the requested service via the network configuration, e.g., established during design time. In at least some embodiments, the monitored results may be evaluated by the SMO controller 180, the intelligent domain controller 181 and/or a combination of both. Such evaluations may be accomplished in whole or in part by one or more of the Apps, e.g., the rApps and/or the xApps operating alone or in combination. In at least some embodiments, the evaluations may be adapted to determine whether one or more service requirements, e.g., SLA, are being met at the time of monitoring. Alternatively, or in addition, the evaluations may be adapted to determine and/or otherwise estimate or predict whether continued satisfaction of the service requirement(s) may be in jeopardy, perhaps at some future time as may be determined according to a change and/or trend in monitored status. In either instance, the SMO controller 180 and/or one or more of the intelligent domain controllers 181 may identify a revised configuration, e.g., a reconfiguration, adapted to mitigate an actual and/or perceived network deficiency in delivery of the service. In at least some embodiments, the network monitoring and reconfiguration may occur in a closed loop manner over an extended duration that may include a substantial portion and/or an entire duration of a delivery of a requested service to the user equipment and/or perhaps some extended duration, e.g., to account for a possibility of a subsequent request for the same and/or similar service by the mobile device 124.

The example system 100 includes examples of network-accessible services, distinguished according to an example metaverse service 182 and an example non-metaverse service 183. The services 182, 183 may be provided and/or otherwise hosted by one or more back-end servers. Alternatively, or in addition, either or both categories of services 182, 183 may be provided and/or otherwise hosted by configurable resources, e.g., cloud resources as may be represented by a service cloud. In at least some embodiments, the system 100 may distinguish a particular service and/or class of services as may be beneficial to a provision of the service/class of service. According to this example, the metaverse service 182 may be distinguished from non-metaverse services, allowing the example, extended open RAN-style architecture, including any extensions thereto, to manage delivery of the service(s) 182, 183, in an efficient and/or reliable manner.

In this regard, one or more of the Apps, e.g., the rApps hosted and/or running on the SMO controller 180 and/or one or more of the xApps hosted and/or running on one or more of the intelligent domain controllers 181, may be adapted to facilitate a service-based configuration and/or management of network infrastructure based on the particular resource and/or resource category. Such management may include adjusting and/or otherwise tailoring a network configuration and/or optimization for a metaverse service 182 differently from a non-metaverse service 183.

Figure 2A:
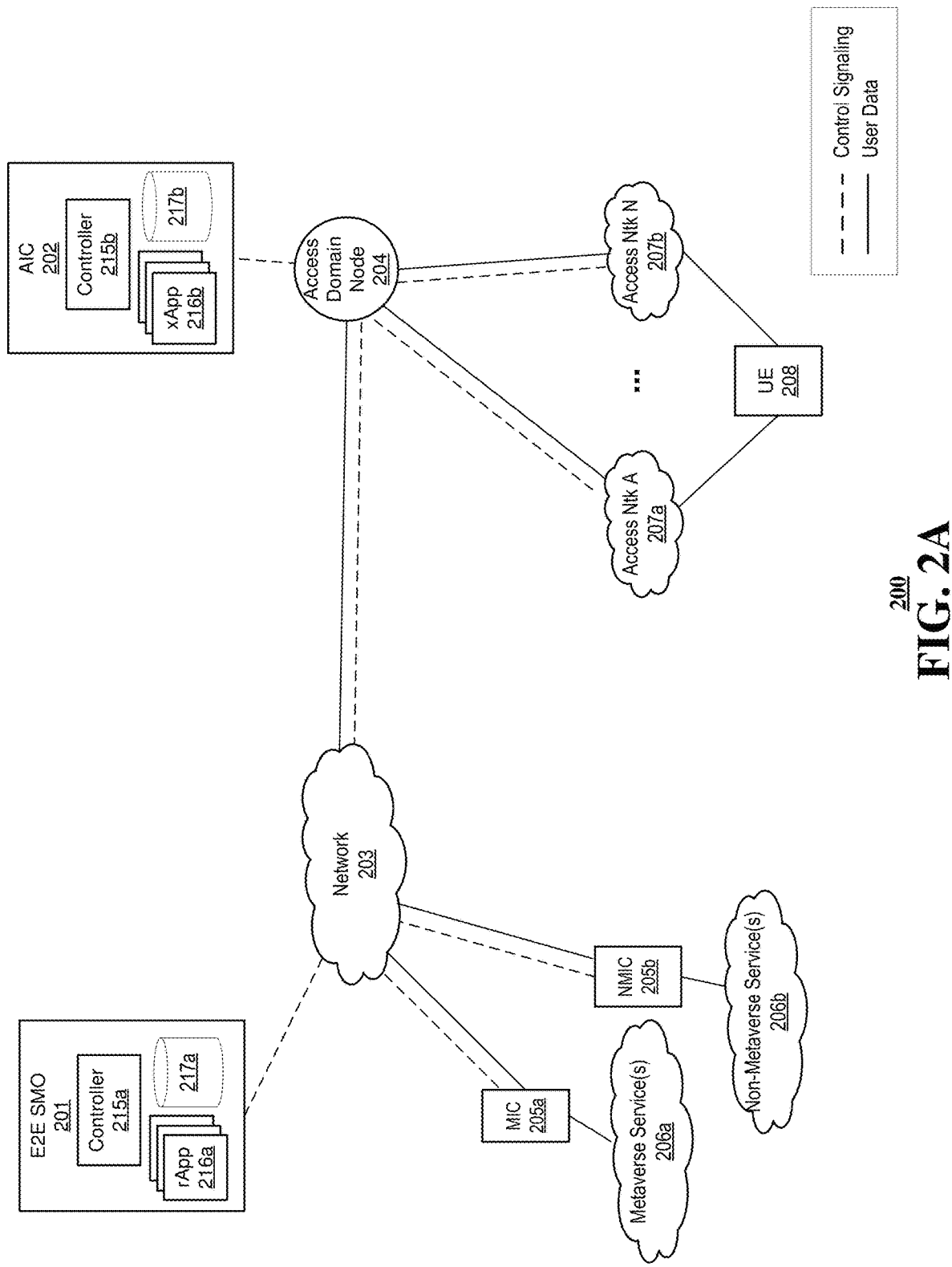
FIG. 2A is a block diagram illustrating an example, non-limiting embodiment of an open access domain system adapted to deliver network-accessible services to mobile subscribers functioning within the communication network of FIG. 1 in accordance with various aspects described herein.

FIG. 2A is a block diagram illustrating an example, non-limiting embodiment of an open access domain system 200 adapted to deliver network-accessible services to mobile subscribers functioning within the system 100 of FIG. 1 in accordance with various aspects described herein. The open network domain system 200 extends an open RAN type of architecture within the access domain that, together with the open RAN type architecture, deliver network-accessible services to mobile subscribers. In at least some embodiments, metaverse services may be distinguished from non-metaverse services, allowing the open RAN type architecture, including any extensions thereto, to facilitate a service-based management of network infrastructure, e.g., tailoring network organization, configuration, reconfiguration and/or optimization for a metaverse service differently from a non-metaverse service.

The example open access domain system 200 includes a SMO controller 201 in communication with an access domain intelligent controller (AIC) 202. According to the illustrative example, the SMO controller 201 and AIC 202 may be in communication via a network 203. The network 203 may include any combination of public and/or private networks, such as the Internet, a metropolitan network, a local area network, a private backbone network, optical networks, such as synchronous optical networking (SONET) and synchronous digital hierarchy (SDH), and/or a passive optical network (PON), such as a gigabit PON (GPON), and the like. Alternatively, or in addition, the access domain controller 202 may be in communication with an access domain node 204. The access domain node 204, in turn, may include one or more network elements adapted to support operation of one or more access networks, such as the example access network A 207a through access network N 207b, generally 207.

According to the example embodiment, the access network 207 may be in communication with user equipment (UE) 208. The access network 207 may function to extend one or more network services to the UE 208. Any network-accessible services may be categorized and managed according to their requirements, such as network requirements, end-user device requirements, equipment locations, service level agreements, and so on. In at least some embodiments, the services may be categorized broadly into metaverse services 206a and non-metaverse services 206b, with an understanding that metaverse service may impose one or more special requirements based on physical characteristics of a user, a user device, a user location, network conditions, and/or a virtual location, a virtual device type, a virtual user, e.g., an avatar, a user's physical proximity and/or virtual proximity to other users, and so on.

The SMO controller 201 may include a centralized controller module 215a, one or more local application programs 216a, and a local data storage module 217a. Likewise, the AIC 202 includes a domain controller module 215b, one or more domain application programs 216b, and a domain data storage module 217b. The centralized controller module 215a may host and/or otherwise facilitate execution or running of one or more of the local application programs 216a. The local data storage module 217a may include, without limitation, network configuration information, e.g., network devices, network connections, endpoints, historical records of monitored network conditions, network architectures, and so on. Likewise, the domain controller module 215b may host and/or otherwise facilitate execution or running of one or more of the domain application programs 216b. The domain data storage module 217b may include, without limitation, network domain information, e.g., network devices, network configurations, device configurations, network connections, endpoints, historical records of monitored network conditions, network architectures, and so on.

It is envisioned that in at least some embodiments, the SMO controller 201 may reside at a centralized location, e.g., supporting any number of access domain intelligent controllers 202, and/or other domain intelligent controllers, that may include, without limitation, network domain intelligent controllers and/or service domain controllers. It is envisioned further that in at least some embodiments, the domain intelligent controllers may be provided in one or more edge networks that may be proximate to one or more managed domain assets.

For example, the AIC 202 may be located at, near and/or within an access domain node 204 associated with the access domain, e.g., access networks 207, being managed by a network operator. To an extent the access network 207 includes a 4G LTE network, the access domain node 204 may include an enhanced NodeB (eNB). Similarly, to the extent the access network 207 includes a 5G network, the access domain node 204 may include a gNB, a gNB—centralized unit (CU) and/or a gNB—distributed unit (DU).

The local application programs 216a of the SMO controller 201 may be directed generally to non-time sensitive applications, such as those adapted to impose rules, policies and/or other functionality, that may be applied during a design time, when planning for support of a particular access domain and/or service domain. For example, non-time sensitive application programs 216a may facilitate a configuration of a network and/or one or more of the domain application programs 216b. The domain application programs 216b may be directed generally to time sensitive applications that may require real time and/or near-real time responsiveness, such as those adapted to adapt an access network configuration. The time sensitive application programs 216b may be applied during run time, when responsiveness is important to ensure that a minimum level of service is maintained during all foreseeable and perhaps some not-so foreseeable conditions. For example, the time sensitive application programs 216b may facilitate reconfigurations of a network responsive to network monitoring, e.g., to identify current and/or to predict future conditions during which a minimum service requirement may not be met. In such instances, the network may be reconfigured, e.g., according to the time sensitive application programs 216b alone or in combination with the non-time sensitive application programs 216a.

By way of example, network monitoring may observe one or more network parameters, such as network latency, network congestion, network utilization bandwidth, error conditions, and the like. The monitored parameters may be evaluated alone and/or in combination with supplemental information. Supplemental information may include, without limitation, historical network conditions, expected changes to network conditions, scheduled maintenance actions, observed maintenance conditions, planned events that may impact network traffic, weather conditions, sporting events, daily commutes, emergencies, and so on.

The services may include, without limitation, voice communications, voice over internet protocol (VoIP), videoconferencing, messaging services, such as short messaging service (SMS), multimedia messaging service (MMS), email, file transfer, web browsing, streaming services, such as streaming audio and/or streaming video, video-on-demand, pre-programmed content, general business applications, advertising, gaming, machine automation, internet of things (IoT), autonomous transportation, e.g., self-driving vehicles, virtual reality, augmented reality, mixed reality, metaverse, and so on. The UE 208 may include, without limitation, desktop computers, laptop computers, tablet devices, smartphones, smart televisions (TV), gaming consoles, gaming controllers, home appliances, surveillance systems, home and/or industrial automation systems, robotic devices, vehicles, and so on.

Access networks 207 may include, without limitation radio access networks, as may be used in mobile cellular communications, e.g., according to one or more of established and/or emerging 4G, LTE, 5G, and 6G technologies. Other types of access networks 207 may include, without limitation, wireless access networks, such as satellite communication networks, microwave line-of-sight communication networks, free-space optical communication networks, acoustic communication networks, infrared communication networks, and the like. Alternatively, or in addition, still other types of access networks 207 may include wired and/or tethered networks, such as fiberoptic links, including PON and/or GPON, LANs, e.g., Ethernet, coaxial cable, power line communications, and the like.

Continuing with the illustrative example, at least some of the metaverse services 206a may have an associated metaverse intelligent controller (MIC) 205a. The MIC 205a may be adapted to manage a network service according to one or more requirements of the related metaverse service(s) 206a. Likewise, the non-metaverse intelligent controller (NMIC) 205b may be adapted to manage a network service according to one or more requirements of the related metaverse service(s) 206b. The MIC 205a and NMIC 205b, may be collectively referred to as service domain controllers 205. The service domain controllers 205 may be in communication with the SMO controller 201.

Figure 2B:
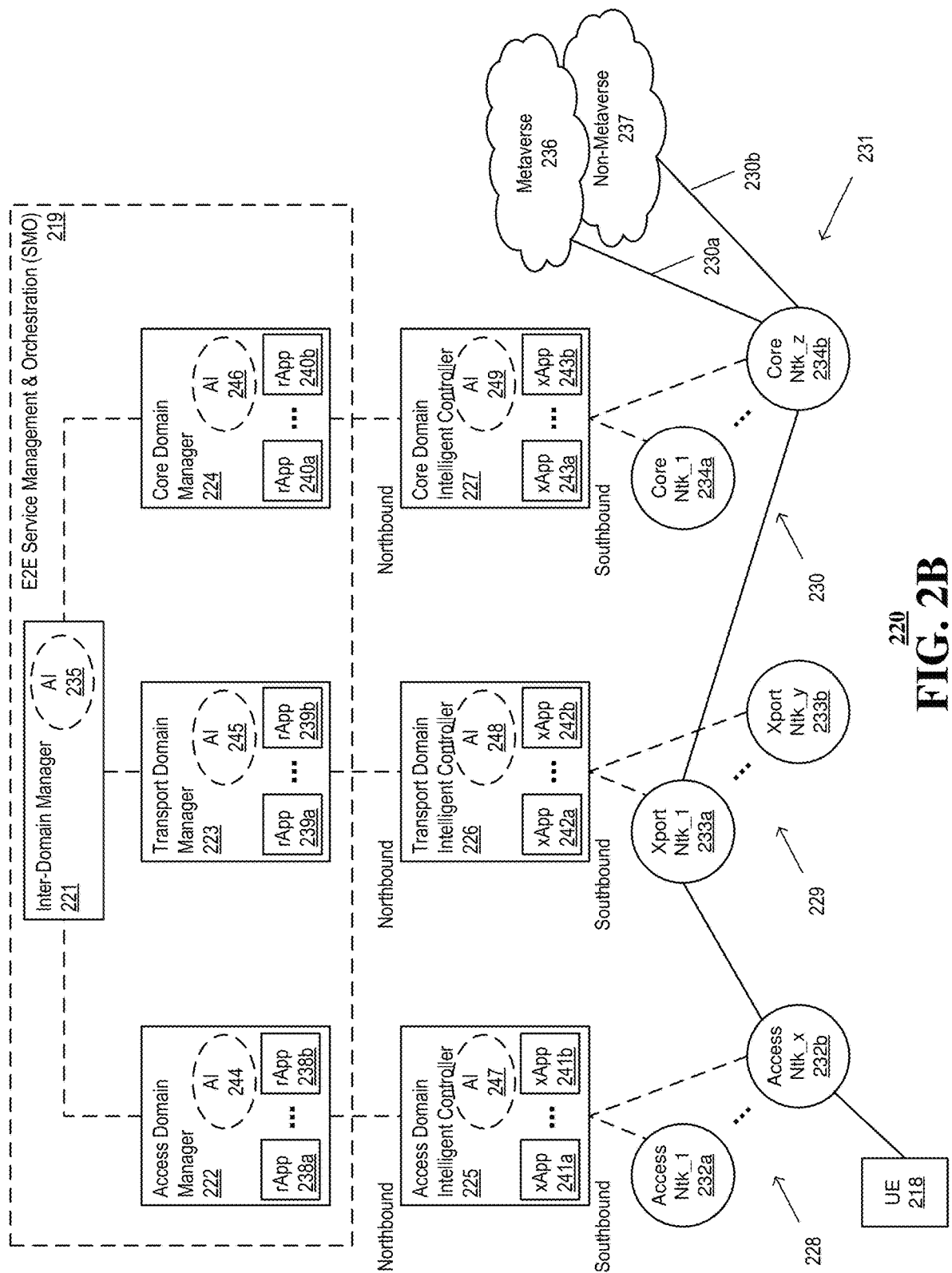
FIG. 2B is a block diagram illustrating another example, non-limiting embodiment of an open network domain system adapted to deliver network-accessible services to mobile subscribers functioning within the communication network of FIG. 1 in accordance with various aspects described herein.

FIG. 2B is a block diagram illustrating another example, non-limiting embodiment of an open network domain system 220 adapted to deliver network-accessible services to mobile subscribers functioning within the system 100 of FIG. 1 in accordance with various aspects described herein. The example open network domain system 200 includes an SMO controller adapted to manage and/or orchestrate network services over two or more different network domains. The multiple network domains may be interconnected, e.g., in a serial or chained arrangement, such that network traffic between endpoints traverses each of the different domains. In at least some embodiments, the multiple network domains may include an overall, end-to-end (E2E) communications link, in which instances, the SMO controller may be referred to as an E2E-SMO controller, 219. The E2E-SMO controller 219 may be in communication with a group of network domain intelligent controllers, which may include a respective one for each domain of an E2E network path 231.

According to the illustrative example, the E2E network path 231 is established between user equipment 218 and one or more network-accessible services. An endpoint for one or more of the services may include a back-end server, and/or a connection at an intermediary location, such as a core network of a mobile network operator, to a wide area network, e.g., the Internet. More generally, the E2E network path 231 may include an E2E service from user equipment to an end service provider, and/or any two endpoints therebetween as may be convenient for managing delivery of the network-accessible services.

The services are illustrated as service clouds and loosely categorized as a metaverse service cloud 236 and a non-metaverse service cloud 237. It is envisioned that such service clouds may be distinguished according to any other category as may be convenient for managing delivery of network-accessible services. By way of nonlimiting example, other service clouds may include an IoT service cloud, a streaming media service cloud, a gaming service cloud, and so on. The service clouds 236, 237 may loosely represent physical networks and/or a physical network-accessible resources, such as datacenters, and/or back-end servers. Alternatively, or in addition, the service clouds 236, 237 may represent virtualized hardware and/or software environments, such as those utilizing virtualized network function (VNF), SDN resources, cloud services, and/or some combination of thereof. It is further understood that the each of the representative service clouds 236, 237 may be adapted for a single service, such as the World of Warcraft® massively multiplayer, online role-playing game, and/or multiple services such as different virtual reality (VR), and/or augmented reality (AR) and/or extended reality (XR) applications. Such applications have at least some common aspects, e.g., in which a physical user and/or user device interacts with environments, objects and/or other individuals in a virtual environment and/or some mixture of a physical and virtual environment.

The example E2E network path 231 includes an access domain segment 228 supporting communications between user equipment 218 and equipment of an access network 232a, 232b, generally 232, to deliver network-accessible services to the user equipment 218. In at least some embodiments, the user equipment 218 may include mobile equipment, with the access network 232 providing a wireless mobile service adapted to manage delivery of network-accessible services in view of the mobility. In at least some embodiments, the E2E network path 231 may include a transport domain segment 229, e.g., supporting communications between the access network 232 and some other network resource. The transport domain segment 229 may include one or more transport networks 233a, 233b, generally 233. The transport networks 233 may be identical, e.g., as in a redundant configuration, similar in at least some regard, e.g., being wired or wireless, and/or entirely different. The example E2E network path 231 includes a core network domain segment 230 supporting communications between the transport network 233 and some other network resource, e.g., a service cloud 236, 237. The core domain segment 230 may include one or more core networks 234a,234b, generally 234. The core networks 234 may be identical, e.g., as in a redundant configuration, similar in at least some regard, e.g., operating according to a similar mobile network protocol, or according to a different network protocol.

The open network domain system 220 includes an access domain intelligent controller (AIC) 225 adapted to configure network resources of the access domain segment 228, to monitor network activity of the network domain segment and/or to reconfigure the network resources of the access domain segment 228. Such reconfigurations may occur responsive to monitored network activity of the access domain segment 228. The AIC 225 may include a southbound interface in communication with equipment of the group of access networks 232 and a northbound interface in communication with the E2E-SMO controller 219.

A first access network 232a may include network equipment according to a first type of access network, e.g., a first type of mobile cellular radio access network (RAN), e.g., a 5G RAN that includes one or more gNB-central units (CU) and one or more gNB-distributed units (DU). A second access network 232b may include network equipment according to a second type of access network that may be the same, similar, or different from the first type of access network. For example, the second access network 232b may include a RAN network according to a 4G RAN, e.g., a 4G LTE RAN. Other access networks may include, without limitation, WiFi, Bluetooth, wired, e.g., LAN, Ethernet, and the like.

In more detail, the AIC 225 may include a group of executable functions and/or application programs, e.g., xApp 241a . . . xApp 241b, generally 241. The AIC xApps 241 may be adapted to perform time sensitive tasks related to operation and/or management of the access domain segment 228. It is envisioned that the AIC 225 may be deployed at an edge network of the open network domain system 220, which may be proximal to the user equipment 218. Accordingly, the AIC 225 may be relatively well positioned to respond quickly, e.g., without network latency and/or possibly network congestion, when compared to other devices, such as the E2E-SMO controller 219, which may be geographically remote from the edge network and the user equipment 218. The E2E-SMO controller 219, in turn, may include another group of executable functions and/or application programs.

The example E2E-SMO controller 219 includes a separate domain manager for each of the network domains being managed. According to the example configuration, the E2E-SMO controller 219 includes an access domain manager 222, a transport domain manager 223 and a core domain manager 224. The access domain manager 222 may include another group of executable functions and/or application programs, e.g., rApp 238a . . . rApp 238b, generally 238, adapted to perform functionality related to operation and/or management of the access domain segment 228. In at least some embodiments, the rApps 238 may be allocated, adapted and/or or otherwise arranged to perform substantially time-insensitive functions. In at least some embodiments, at least some of the xApps 241 and at least some of the rApps 238 may cooperate to establish and/or otherwise support delivery of one or more network-accessible services to the user equipment 218.

Likewise, in at least some embodiments, the transport domain manager 223 may include another group of executable functions and/or application programs, e.g., rApp 239a . . . rApp 239b, generally 239, adapted to perform functionality related to operation and/or management of the transport domain segment 229, and the core domain manager 224 may include another group of executable functions and/or application programs, e.g., rApp 240a . . . rApp 240b, generally 240, adapted to perform functionality related to operation and/or management of the core domain 230. In at least some embodiments, the rApps 239, 240 may be allocated, adapted and/or or otherwise arranged to perform substantially time-insensitive functions according to their respective network domain segments 229, 230.

The example open network domain system 220 includes a transport domain intelligent controller (TIC) 226 adapted to configure network resources of the transport domain segment 229, to monitor network activity of the transport domain segment and/or to reconfigure the network resources of the transport domain segment 229. Such reconfigurations may occur responsive to monitored network activity of the transport domain segment 229. The TIC 226 may include a southbound interface in communication with equipment of the group of transport networks 233 and a northbound interface in communication with the E2E-SMO controller 219, e.g., in communication with the transport domain manager 223. A first transport network 233a may include network equipment according to a first type of access network, e.g., a fiber-based, tethered network operated by a fiber service provider. A second transport network 233b may include network equipment according to a second type of transport network that may be the same, similar, or different from the first type of transport network 233a. For example, the second transport network 233b may include a fiber-based, tethered network operated by the same service provider, e.g., a different channel, a different fiber and/or perhaps a different service provider. Other transport networks 233 may include, without limitation, coaxial cable-based link and/or other wired or tethered networks, wireless or untethered networks, e.g., a terrestrial microwave link, a free-space optical link, a satellite link and so on.

In more detail, the TIC 226 may include a group of executable functions and/or application programs, e.g., xApp 242a . . . xApp 242b, generally 242. The xApps 242 may be adapted to perform time sensitive tasks. It is envisioned that the TIC 226 may be deployed at an edge network of the open network domain system 220, which may be proximal to a control and/or entry point of one or more of the different transport networks, e.g., at one or more nodes of the access networks 232. Accordingly, the TIC 226 is relatively well positioned to respond quickly, e.g., without network latency and/or possibly network congestion, when compared to other devices, such as the E2E-SMO controller 219, which may be geographically remote from the edge network, the transport network 233 and/or node(s) of the access network 232. The group of executable functions and/or application programs of the E2E-SMO controller 219, e.g., the rApps 239 of the transport domain manager 223, may be adapted to cooperate with one or more of the transport domain xApps 242 of the TIC 226, e.g., being allocated, adapted and/or or otherwise arranged to perform substantially time-insensitive functions related to operation and/or management of the transport network 233 as may be necessary to establish and/or otherwise support delivery of one or more network-accessible services to the user equipment 218.

The open network domain system 220 includes a network core domain intelligent controller 224 adapted to configure network resources of the network core domain segment 230, to monitor network activity of the network core domain segment 230 and/or to reconfigure the network resources of the network core domain segment 230. Such reconfigurations may occur responsive to monitored network activity of the network core domain segment 230. The network core domain intelligent controller 227 may include a southbound interface in communication with equipment of the group of network cores 230 and a northbound interface in communication with the E2E-SMO controller 219.

A first core network 234a may include network equipment according to a first type of core network, e.g., evolved packet core (EPC) networks, a 4G core network, a 4G/LTE core network, a 5G core network, a 6G core network, and/or any combination thereof. A second core network 234b may include network equipment according to a second type of core network that may be the same, similar, or different from the first type of core network 234a. For example, the first core network 234a may include an EPC network, while the second core network 234b may include a 5G core network.

In more detail, the CIC 227 may include a group of executable functions and/or application programs, e.g., xApp 243a . . . xApp 243b, generally 243. The xApps 239 may be adapted to perform time sensitive tasks. It is envisioned that the CIC 227 may be deployed at an edge network of the open network domain system 220, which may be proximal to a control and/or entry point of one or more of the different core networks 234, and/or at one or more nodes of the access networks 232. Accordingly, the CIC 227 is relatively well positioned to respond quickly, e.g., without network latency and/or possibly network congestion, when compared to other devices, such as the E2E-SMO controller 219, which may be geographically remote from the edge network, the core network 234, the transport network 233 and/or node(s) of the access network 232. The group of executable functions and/or application programs of the E2E-SMO controller 219, e.g., the rApps 240 of the core domain manager 224, may be adapted to cooperate with one or more of the core domain xApps 243 of the CIC 227, e.g., being allocated, adapted and/or or otherwise arranged to perform substantially time-insensitive functions related to operation and/or management of the core network 234 as may be necessary to establish and/or otherwise support delivery of one or more network-accessible services to the user equipment 218.

In at least some embodiments, the E2E-SMO controller 219 includes an inter-domain manager 221. The inter-domain manager 221 may be in communication with one or more other domain managers of the E2E-SMO controller 219, e.g., the access domain manager 222, the transport domain manager 223, and/or the core domain manager 224. In at least some embodiments, the inter-domain manager 221 may coordinate interoperation between and/or among the access domain manager 222, the transport domain manager 223 and/or the core domain manager 224. In at least some embodiments, the inter-domain manager 221 may include another group of executable functions and/or application programs adapted to perform functionality related to operation and/or management of the end-to-end network path 231. For example, the group of executable functions of the inter-domain manager 221 may address interoperability among the different domain managers, and/or configuration management, e.g., including optimization, of an end-to-end network service over the E2E network path 231.

It is worth noting here, that although the illustrative example E2E-SMO controller 219 includes a separate access domain manager 222, transport domain manager 223 and core domain manager 224, each including their respective rApps 238, 239, 240, it is conceivable that the any one of the domain managers 222, 223, 224 may be adapted to manage interoperations with more than one of the different access domain controllers, e.g., more than one of the AIC 225, the TIC 226 or the CIC 237. In such instances, complexity of the E2E-SMO controller 219 may be reduced by allowing a lesser number of domain managers to support E2E SMO services to the E2D network path 231. In at least some embodiments, the E2E-SMO controller 219 may include a single domain manager, e.g., the inter-domain manager 221, to manage up to and including all of the different domains of the E2E network path 231.

In at least some embodiments, advanced techniques, such as data analytics, artificial intelligence and/or machine learning may be applied to one or more of the domain intelligent controllers 225, 226, 227, the domain managers 222, 223, 224 and/or the inter-domain manager 221. Such advanced techniques may be applied in such a manner as to adapt intelligent management and/or control of network service to the E2E network path 231. In at least some embodiments, an application of the advanced techniques may include an artificial intelligence module adapted to apply machine learning. In at least some embodiments, a machine learning module may be adapted to apply one or more algorithms that implement predictive analysis. The algorithms may be linear algorithms and/or deep learning algorithms, e.g., that may include a stacked hierarchy of increasing complexity and abstraction that may, in at least some instances, build a feature set without requiring operator intervention and/or supervision.

By way of illustrative example, the access domain manager 222 may include an AI module 244 that may be adapted to build, train, and/or otherwise update and/or refine an AI access model 247, e.g., a deep learning model. The AI access model 247 may be adapted to organize, configure, and/or otherwise adapt a configuration of the access network 232. The AI access model 247 may be provided to the AIC 225, which may be adapted to operate one or more of the xApps 241 in association with an implementation of the AI access model 247. In at least some embodiments, the AI access model 247 may be adapted to configure, reconfigure and/or otherwise control of the access network 232 to meet a requirement, such as a requirement of an underlying service, e.g., one or more requirements as may be identified in a service level agreement (SLA). Alternatively, or in addition, the AI access model 247 may be adapted to apply optimization to a configuring, reconfiguring and/otherwise controlling of the access network 232. Optimization may include optimization of a network parameter, such as bandwidth, frequency utilization, error performance, reliability, and the like. Alternatively, or in addition, the optimization may include an optimizing of operating expense, e.g., organizing, configuring and/or reconfiguring the access network 232 to minimizing operating expense, while maintaining a requirement, such as the SLA.

In at least some embodiments, the AI access model 247 may operate in a closed-loop configuration to adjust the access network 2323 as may be necessary to maintain the SLA, while optimizing a parameter, such as operating expense of the access network 232. Alternatively, or in addition, the AI module 244 may be adapted to retrain, update and/or otherwise revise the AI access model 247. Such updating may be accomplished, at least in part, by one or more of the rApps 238. It is understood that in at least some embodiments, the AI access model 247 may be adapted to select one of a number of available access networks 232 in a configuration and/or reconfiguration procedure, to optimize a network parameter, such as the operating expense.

Alternatively, or in addition, the transport domain manager 223 may include an AI module 245 that may be adapted to build, train, and/or otherwise update and/or refine an AI model 248, e.g., a transport network deep learning model 248. The transport network deep learning model 248 may be adapted to organize, configure, and/or otherwise adapt a configuration of the transport network 233. The AI transport model 248 may be provided to the TIC 226, which may be adapted to operate one or more of the xApps 242 in association with an implementation of the AI transport model 248. In at least some embodiments, the AI transport model 248 may be adapted to configure, reconfigure and/or otherwise control of the transport network 233 to meet a requirement, such as a requirement of an underlying service, e.g., one or more requirements as may be identified in a service level agreement (SLA). Alternatively, or in addition, the AI transport model 248 may be adapted to apply optimization to a configuring, reconfiguring and/otherwise controlling of the transport network 233. Optimization may include optimization of a network parameter, such as bandwidth, frequency utilization, error performance, reliability, and the like. Alternatively, or in addition, the optimization may include an optimizing of operating expense, e.g., organizing, configuring and/or reconfiguring the transport network 233 to minimizing operating expense, while maintaining a requirement, such as the SLA.

In at least some embodiments, the AI transport model 248 may operate in a closed-loop configuration to adjust the transport network 233 as may be necessary to maintain the SLA, while optimizing a parameter, such as operating expense. Alternatively, or in addition, the AI module 245 may be adapted to retrain, update and/or otherwise revise the AI transport model 248. Such updating may be accomplished, at least in part, by one or more of the rApps 239. It is understood that in at least some embodiments, the AI transport model 248 may be adapted to select one of a number of available transport networks 233 in a configuration and/or reconfiguration procedure, to optimize a network parameter, such as the operating expense.

Alternatively, or in addition, the core domain manager 224 may include an AI module 246 that may be adapted to build, train, and/or otherwise update and/or refine an AI core model 249, e.g., a deep learning model. The AI core model 249 may be adapted to organize, configure, and/or otherwise adapt a configuration of the core network 234. The AI core model 249 may be provided to the CIC 227, which may be adapted to operate one or more of the xApps 243 in association with an implementation of the AI core model 249. In at least some embodiments, the AI core model 249 may be adapted to configure, reconfigure and/otherwise control of the core network 234 to meet a requirement, such as a requirement of an underlying service, e.g., one or more requirements as may be identified in a service level agreement (SLA). Alternatively, or in addition, the AI core model 249 may be adapted to apply optimization to a configuring, reconfiguring and/otherwise controlling of the core network 234. Optimization may include optimization of a network parameter, such as bandwidth, frequency utilization, error performance, reliability, and the like. Alternatively, or in addition, the optimization may include an optimizing of operating expense, e.g., organizing, configuring and/or reconfiguring the core network 234 to minimizing operating expense, while maintaining a requirement, such as the SLA.

In at least some embodiments, the AI core model 249 may operate in a closed-loop configuration to adjust the core network 234 as may be necessary to maintain the SLA, while optimizing a parameter, such as operating expense of the core network 234. Alternatively, or in addition, the AI module 246 may be adapted to retrain, update and/or otherwise revise the AI core model 249. Such updating may be accomplished, at least in part, by one or more of the rApps 240. It is understood that in at least some embodiments, the AI core model 249 may be adapted to select one of a number of available core networks 234 in a configuration and/or reconfiguration procedure, to optimize a network parameter, such as the operating expense.

In at least some embodiments, one or more of the AI access models 247, the AI transport model 248 and/or the AI core model 249 may operate independently with respect to monitoring and/or adjusting, e.g., configuring and/or reconfiguring of their respective network domain infrastructure. Accordingly, an optimal solution may include a separate optimization in each domain. Alternatively, or in addition, one or more of the AI access models 247, the AI transport model 248 and/or the AI core model 249 may interoperate to at least some extent, such that an overall optimization of the E2E network path 231 may depend upon interrelationships among and/or between the different network domain segments 228, 229, 230. It is conceivable that an optimal solution in one domain, e.g., the access domain segment 228, may preclude an optimal solution in another domain, e.g., the transport network. Accordingly, an optimal solution may include tradeoffs between the different domain segments 228, 229, 230. In at least some embodiments, the inter-domain manager 221 may include an AI module 235 that may be adapted to account for at least some inter-domain dependencies, e.g., providing inputs into one or more of the AI access model 247, the AI transport model 248 and/or the AI core model 249 adapted to address inter-domain dependencies.

It is worth noting here that although the AIC 225, the TIC 226 and the CIC 227 are illustrated as separate and distinct elements, there is nothing to impose any restriction upon locations of any supporting hardware and/or software. In some instances, each of the AIC 225, the TIC 226 and the CIC 227 are hosted on resources of their respective network domain segments 228, 229, 230. Alternatively, or in addition, two or more of the AIC 225, the TIC 226 and the CIC 227 may be hosted on resources of a common network domain. For example, two or more of the AIC 225 and/or the TIC 226 and/or the CIC 227 may be hosted on resources of the access domain 228, e.g., at an eNB of a 4G/LTE access network and/or a gNB of a 5G access network. Alternatively, or in addition, one or more of the AIC 225, the TIC 226 and the CIC 227 may be hosted on equipment separate and/or distinct from their respective domain segments 228, 229, 230, and possibly distinct from any of the domain segments 228, 229, 230.

In at least some embodiments one or more of the rApps 238, 239, 240, the xApps 241, 242, 243, and/or the AI models 247, 248, 249 may be adapted to distinguish between different categories and/or classes of service. For example, any configuration, re-configuration of network resources in any and/or all the domain segments 228, 229, 230 may be determined and/or otherwise implemented according to an underlying category and/or class of service, possibly arriving at different optimal solutions depending in either instance. By way of example, one such categorization may include distinguishing metaverse services, e.g., according to the metaverse service cloud 236 from non-metaverse services, e.g., according to the non-metaverse service cloud 237. As such different services may impose different requirements according to a type and/or location of an end user and/or user equipment, virtualization, e.g., virtual environments, and so on. Consideration of the different requirements may result in different AI models, different training, and/or different rApps 238, 239, 240 and/or xApps 241, 242, 243.

Figure 2C:
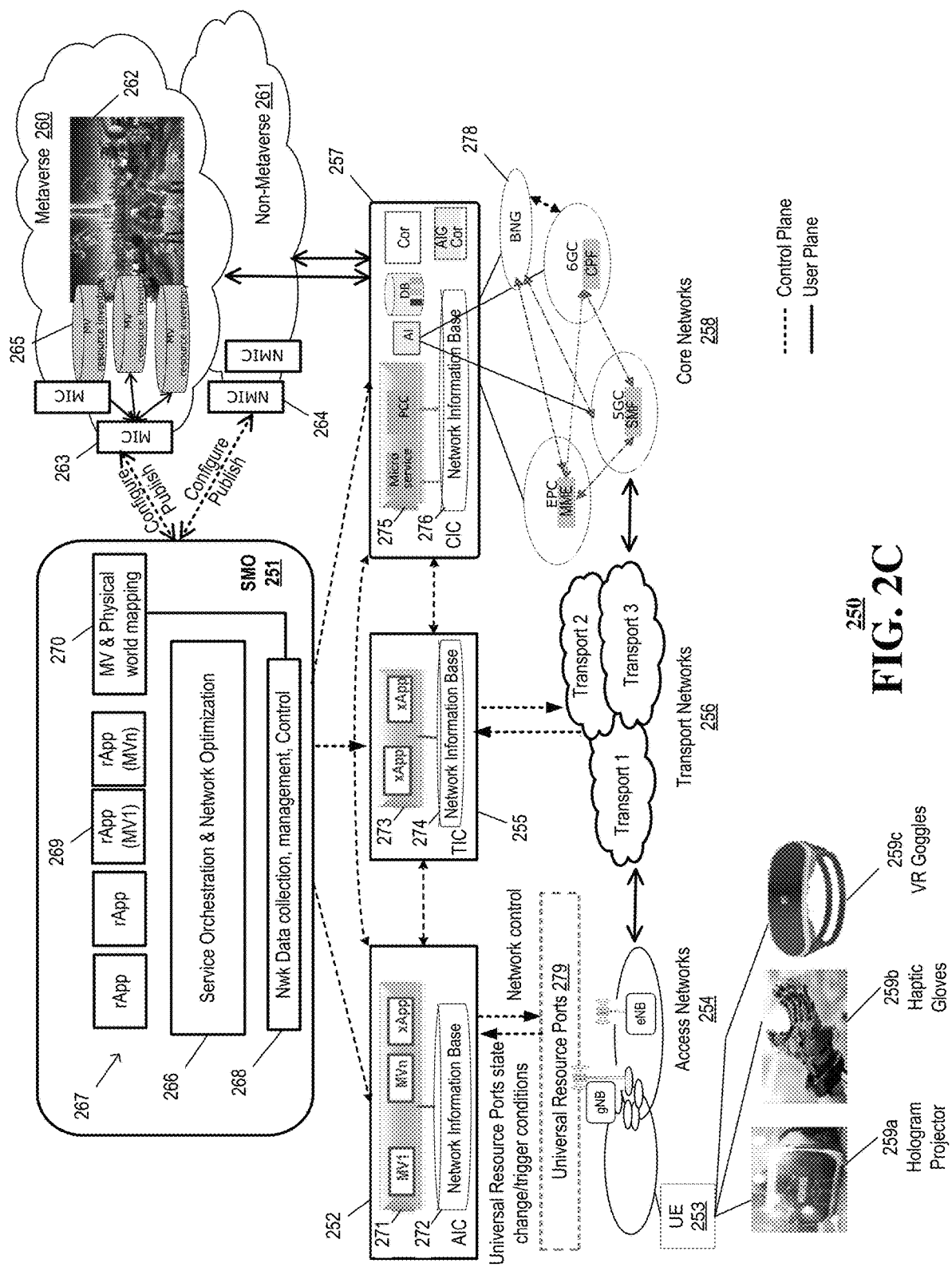
FIG. 2C is a block diagram illustrating yet another example, non-limiting embodiment of an open network domain system adapted to deliver network-accessible services to mobile subscribers functioning within the communication network of FIG. 1 in accordance with various aspects described herein.

FIG. 2C is a block diagram illustrating yet another example, non-limiting embodiment of an open network domain system 250 adapted to deliver network-accessible services to mobile subscribers functioning within the system 100 of FIG. 1 in accordance with various aspects described herein. The open network domain system 250 includes an SMO 251 an AIC 252, a TIC 255 and a CIC 257. The AIC 252 is adapted to organize, configure, monitor and/or re-configure one or more access networks 254. Without limitation, the access networks 254 may include any of the various examples discussed herein. According to the illustrative embodiment, the access networks 254 provides network access to one or more devices, such as user equipment (UE) 253. The number and/or types of UE 253 may vary according to user preference, user accessibility, service requirements, and the like. The example UE 253 may include one or more of VR goggles 259c, haptic devices, such as haptic gloves 259b, and/or hologram devices, e.g., a hologram projector 259.

The AIC 252 may include one or more time sensitive application programs, e.g., xApps 271 and a storage element that may be adapted to store one or more parameters, settings, monitored results and/or features of one or more of the access networks 254, UE 253, and the like. The example storage element is referred to as a network information base 272 that may be in communication with one or more of the xApps 271 and/or one or more of the access networks 254. According to the illustrative example, the AIC 252 is in communication with one or more of the access networks 254 via one or more ports, such as universal resource ports 279. Communications between the AIC 252 and one or more of the access networks 254 may be characterized generally as control messaging, e.g., as may be conveyed via a control plane. The control plane messages may include network control messages, e.g., from the AIC 252 to one or more of the access networks 254 and/or universal resource ports state information, state changes and/or trigger conditions. The access networks 254, as may be configured and/or otherwise deployed to provide network-accessible services to the UE may be adapted to provide user data, e.g., according to user plane traffic, to/from the UE 253.

Similarly, the TIC 255 may include one or more time sensitive application programs, e.g., xApps 273 and a storage element that may be adapted to store one or more parameters, settings, monitored results and/or features of one or more of the transport networks 256, the UE 253, and the like. The example storage element may be referred to as a network information base 274 that may be in communication with one or more of the xApps 273 and/or one or more of the transport networks 256. According to the illustrative example, communications between the TIC 255 and one or more of the transport networks 256 may be characterized generally as control messaging, e.g., as may be conveyed via a control plane. The control plane messages may include network control messages, e.g., from the TIC 255 to one or more of the transport networks 256, possibly including universal resource ports state information, state changes and/or trigger conditions. The transport networks 256, as may be configured and/or otherwise deployed to provide network-accessible services to the UE 253 via the access networks 254, may be adapted to provide user data, e.g., according to user plane traffic, to/from the access network 254. In at least some embodiments, control signaling and/or unrestricted messaging may be provided between the AIC 252 and the TIC 255.

Likewise, the CIC 257 may include one or more time sensitive application programs, e.g., xApps 275 and a storage element that may be adapted to store one or more parameters, settings, monitored results and/or features of one or more of the core networks 258, the access network 256, the UE 253, and the like. The example storage element may be referred to as a network information base 276 that may be in communication with one or more of the xApps 275 and/or one or more of the core networks 258. According to the illustrative example, communications between the CIC 257 and one or more of the core networks 258 may be characterized generally as control messaging, e.g., as may be conveyed via a control plane. The control plane messages may include network control messages, e.g., from the CIC 257 to one or more of the core networks 258, possibly including universal resource ports state information, state changes and/or trigger conditions. The core networks 258, as may be configured and/or otherwise deployed to provide network-accessible services to the UE 253 via the access networks 254, may be adapted to provide user data, e.g., according to user plane traffic, to/from the transport network 256. In at least some embodiments, control signaling and/or unrestricted messaging may be provided between the AIC 252, the TIC 255 and/or the CIC 257.

One or more of the AIC 252, the TIC 255 and/or the CIC 257 may be in communication with the SMO 251, e.g., exchanging messages and/or signaling related to control of the network and/or the intelligent controllers 252, 255, 257. The SMO 251 may be adapted to include one or more application programs, such as non-time sensitive applications, e.g., rApps 267 as may be applied to organization, configuration, operation and/or monitoring of network resources, including imposition and/or enforcement of one or more related rules and/or policies, e.g., network policies. In at least some embodiments, the example SMO 251 may include a storage element 268 adapted for storage and retrieval of information related to one or more of network management and/or control, management, and control of one or more of the AIC 252, the TIC 255 and/or the CIC 257, network data collection, and the like. In at least some embodiments, the SMO 251 may include a controller module 266 adapted to facilitate one or more of service orchestration and/or network optimization. The controller module 266 may be in communication with one or more of the rApps 267 and/or the storage element 268.

The core networks 258 may provide data interfaces to other networks, such as the Internet, other service provider networks, back-end servers of one or more network-accessible services, and so on. The services may be organized, distinguished and/or otherwise characterized in any manner as may facilitate delivery of the network-accessible service to the UE 203, such as the various examples disclosed herein. According to the illustrative example, the services may include metaverse services, represented generally by a metaverse service cloud 260, and non-metaverse services, represented generally by a non-metaverse service cloud 261.

In at least some embodiments, the open network domain system 250 includes one or more service-level intelligent controllers. According to the illustrative example, the metaverse service cloud may have one or more associated metaverse intelligent controllers (MIC) 263. For example, one MIC 263 may be associated with a particular metaverse service, such as a metaverse space operated by a metaverse service provider. Alternatively, or in addition, a MIC 263 may be associated with a particular service provider, and/or a particular category and/or family of services. The MIC 263 may be hosted in whole or in part on edge network equipment at a network location as may be advantageous to facilitate efficient and timely monitoring and/or management of the service and/or network resources supporting the network-accessible service. Accordingly, the MIC 263 may include one or more application programs, e.g., xApps, that may be associated with time sensitive functions, and possibly a local storage element as may be adapted to store one or more of network data collection, network management and/or control parameters. Alternatively, or in addition, the local storage element may be adapted to store one or more of service data collection, service management and/or service control parameters. In at least some embodiments the MIC 263 may include and/or be in communication with stored metaverse resource information, such as a metaverse resource inventory 265. The metaverse resource inventory 265 may include metaverse requirements, e.g., as may be identified and/or otherwise recommended by a metaverse service provider and/or according to any corresponding service level agreements.

According to the illustrative example, the non-metaverse service cloud may have one or more associated non-metaverse intelligent controllers (NMIC) 264. For example, one NMIC 264 may be associated with a particular non-metaverse service, such as a streaming media service as may be operated by a corresponding service provider. Alternatively, or in addition, a NMIC 264 may be associated with a particular service provider, and/or a particular category and/or family of services. The NMIC 264 may be hosted in whole or in part on edge network equipment at a network location as may be advantageous to facilitate efficient and timely monitoring and/or management of the service and/or network resources supporting the network-accessible service. Accordingly, the NMIC 264 may include one or more application programs, e.g., xApps, that may be associated with time sensitive functions, and possibly a local storage element as may be adapted to store one or more of network data collection, network management and/or control parameters. Alternatively, or in addition, the local storage element may be adapted to store one or more of service data collection, service management and/or service control parameters. In at least some embodiments the NMIC 264 may include and/or be in communication with stored non-metaverse resource information, such as a non-metaverse resource inventory. The non-metaverse resource inventory may include non-metaverse requirements, e.g., as may be identified and/or otherwise recommended by a non-metaverse service provider and/or according to any corresponding service level agreements.

It is further envisioned that one or more of the MIC 263 and/or the NMIC 264 may be in communication with the SMO 251. In such instances, the SMO 251 may include rApps, store data and/or provide orchestration and/or optimization as may be related to delivery of network-accessible services according to corresponding metaverse service cloud 260 and/or non-metaverse service cloud 261. For example, some of the rApps 267 may be directed towards network domains, e.g., functioning in cooperation with one or more of the AIC 252, TIC 255 and/or CIC 257. Alternatively, or in addition, the rApps 267 may include one or more other apps 269 as may be associated with metaverse services, e.g., accessible via the metaverse service cloud 260 and/or non-metaverse services as may be accessible via the non-metaverse service cloud 261. In at least some embodiments, the SMO 251 storage element may include a service storage element 270 as may be used to store information related to supported services. According to the illustrative embodiment, the service storage element 270 may store metaverse state information, e.g., including participants, avatars, equipment, and so on, and possibly, corresponding physical world mapping, e.g., associating one or more metaverse entities with one or more corresponding physical world counterparts. Such metaverse to physical world mappings may include physical locations of UE 253 as may be beneficial in identifying edge network resources, configuring and/or operating MICs 263 and interoperation between the SMO 251 and the MIC(s) 263.

Figure 2D:
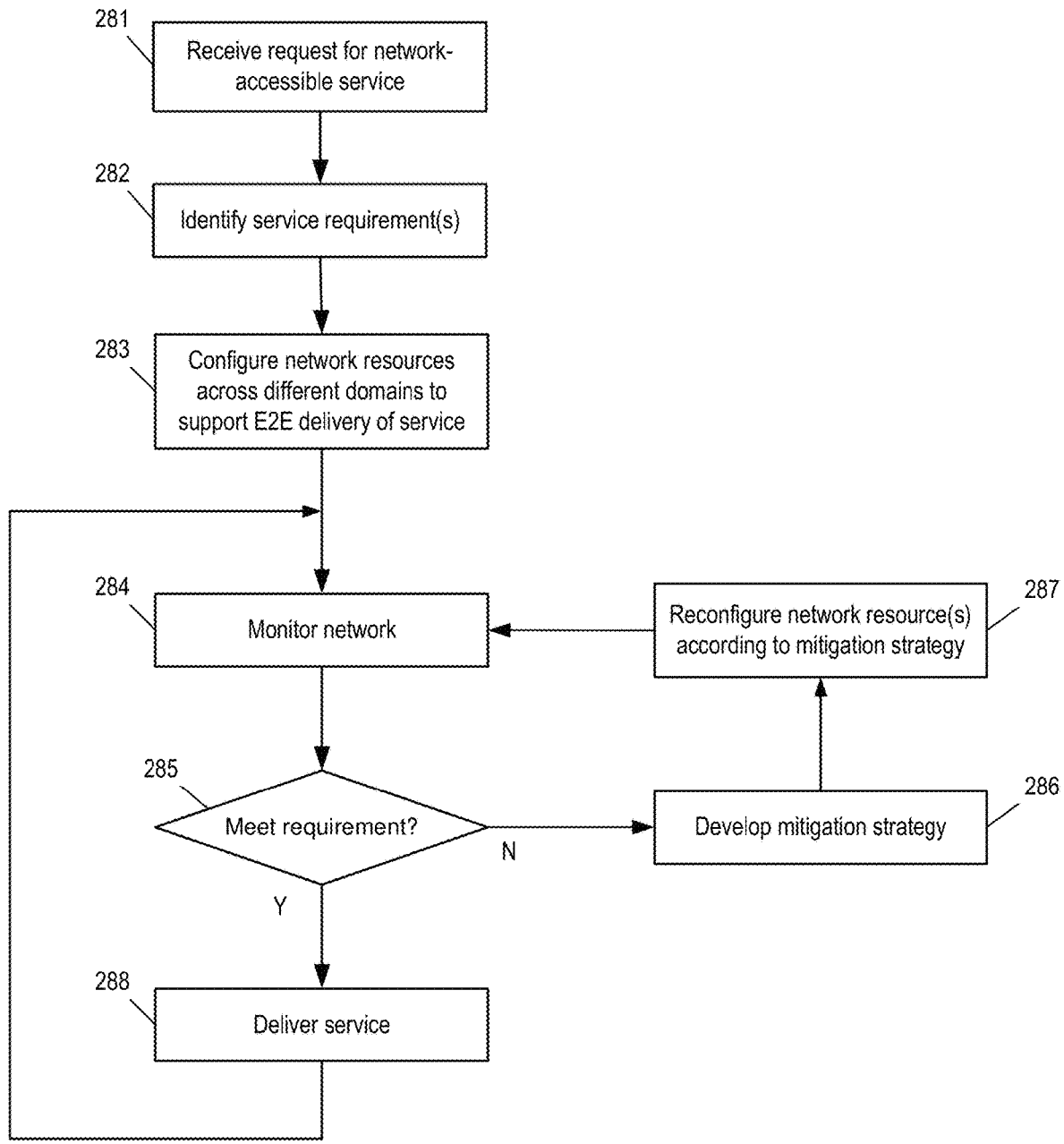
FIG. 2D depicts an illustrative embodiment of a process supporting an open network domain system adapted to deliver network-accessible services to mobile subscribers in accordance with various aspects described herein.

FIG. 2D depicts an illustrative embodiment of a process 280 supporting an open network domain system adapted to deliver network-accessible services to mobile subscribers in accordance with various aspects described herein. The example process 280 may facilitate extension of an open RAN type of architecture within an access network domain and in at least some embodiments, into other domains. The domains may include network domains, such as the example transport and/or core network domains that, together with the open RAN architecture, deliver network-accessible services to mobile subscribers. Alternative, or in addition, the domains may include one or more service domains. According to the service domain, services may be distinguished according to a specific service, e.g., a branded service, such as distinguishing the World of Warcraft® massively multiplayer online roleplaying game from Runes of Magic® massively multiplayer online roleplaying game. Alternatively, or in addition, the service domain, services may be distinguished according to a type of service and/or a service, e.g., distinguishing a massively multiplayer online roleplaying game servicer from a streaming media service. In at least some embodiments, the service domain, services may be distinguished according to a broader categorization of services, such as distinguishing metaverse services from non-metaverse services. Such service distinctions may allow the intelligent control operations, such as the open-RAN architecture, including any extensions thereto, to facilitate a service-based management of network infrastructure, e.g., tailoring network optimization according to the service provided via the network configuration.

A request for network-accessible service may be received at 281. In some embodiments, the request for network accessible service may originate from user equipment attached to an intelligently controlled network, such as the example open access domain system 200 and open network domain system 220 (FIGS. 2A-2B). The request may be received by one or more of an access network, a core network, and/or a SMO device or system. In at least some embodiments, the service request may be evaluated, examined, parsed and/or otherwise interpreted to identify any service requirement(s) at 282. Without limitation, service requirements may include any of the examples disclosed herein, or otherwise generally understood as requirements for access to and/or delivery of a network-accessible service. For example, the service requirement may identify a particular service, a service provider, a type of service, e.g., according at a number of predetermined service categories. Alternatively, or in addition, the service requirement may identify an end-user device requirement, e.g., a type of hardware device, a location of the device, a memory capacity of the device, a screen resolution of the device. Still other service requirements may include a network, requirement, such as a required bandwidth, data rate, error rate, latency, and the like.

Network resources may be configured at 283 within an access domain, e.g., configuring and/or selecting from among a number of optional networks within a single domain, such as the RAN domain. Alternatively, or in addition, the network resources may be configured across different domains, e.g., configuring and/or selecting from among a number of optional networks within multiple domains that may interconnect, interoperate and/or otherwise cooperate to support E2E delivery of a requested service to user equipment.

A network that has been allocated and/or otherwise configured to provide a network-accessible service to user equipment may be monitored at 284. Without limitation, monitoring may include monitoring performance of the network, including the E2E network, and/or one or more network domains that collectively establish the E2E network. By way of example, network monitoring may include monitoring data rates, error conditions, including forward error correction (FEC) conditions, latency, network traffic conditions, congestion, channel conditions, e.g., multipath, interference, noise floor, and the like. Alternatively, or in addition, monitoring may include monitoring one or more aspects related to an associated network-accessible service. By way of further example, service-related monitoring may include service start time, service duration, service requirement status, service activity and/or inactivity. It is envisioned that in at least some embodiments, monitoring may include monitoring one or more aspects of an end-user device, such as a power level, a battery status, a storage capacity, a screen resolution, and the like.

To the extent it is determined at 285 that the one or more requirements are met, the service may be delivered to the end-user equipment at 288. However, to the extent it is determined at 285 that one or more of the requirements are not met, and/or may be trending in a direction to suggest that the requirement may not be met at a future time, e.g., possibly placing the service requirement(s), such as an SLA, in jeopardy, a mitigation strategy may be developed at 286. In at least some embodiments, the mitigation strategy may include a reconfiguration of network resources, in which instances, the network resource(s) may be reconfigured at 287 according to mitigation strategy. To the extent the mitigation strategy relates to the service itself, the mitigation strategy may initiate and/or otherwise recommend a modification to the service, e.g., reverting to a lower screen resolution, screen size, user interactivity responsiveness, and so on. Alternatively, or in addition, to the extent the mitigation strategy relates to the end-user device, the strategy may initiate and/or otherwise recommend a modification to the end-user device, e.g., changing a screen resolution, a screen size, turning off one or more features, reducing data processing and/or service requirements, and the like.

It is further envisioned that in at least some embodiments, a configuration of the network, the service and/or an end-user device may have an identified preferred configuration. To the extent that any portion of the network, service or user equipment may have been reconfigured and/or otherwise adjusted according to a mitigation strategy, the monitoring may continue to identify opportunities to reconfigure towards the preferred configuration.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The techniques disclosed herein include an end-to-end network architecture framework to support delivery of network-accessible services. In at least some embodiments, the network architecture framework is determined according to a nature of the services, e.g., whether they may be categorized as metaverse and/or non-metaverse services. In at least some embodiments, the framework may be implemented as an extension of the Open RAN to an open eco-system adapted to support existing and future services.

In at least some embodiments, the end-to-end network and/or service architecture may employ one or more components determined according to building blocks that include, without limitation, a metaverse intelligent controller, a non-metaverse intelligent controller, an SMO, and/or domain intelligent controllers, such as an AIC, TIC and CIC.

In more detail, one or more of the MIC and the NMIC may be adapted to implement functionality according to a design time process and a run-time process. According to an example design time process, the MIC may configure one or more metaverse functions that may be implemented as application programs or apps, e.g., rApps and/or xApps as may be necessary to meet objectives of different metaverse and non-metaverse use cases and/or services to enhance end user experiences and, in at least some embodiments, to do so in an efficient, e.g., optimal manner with respect to management of network resources, such as bandwidth, and/or operating costs.

In support of these objectives, management of the metaverse and/or non-metaverse services may be determined at least in part on information sourced from the application and/or subscriber domains. In at least some embodiments, one or more of the MIC and/or NMIC may serve as a clearing house to communicate with other MIC and/or NMIC devices. Such interactions may be accomplished by a configure and/or publish procedure, in which details, e.g., one or more of UE information, possibly AI models, rApps, and/or xApps may be determined in one domain and/or under the coordination of one network operator, e.g., one SMO controller. Such details may be published and/or otherwise pushed to other devices, such as the MIC and/or NMIC, allowing the MIC and/or NMIC to provide such published details to another network operator, e.g., another SMO controller, allowing the new SMO controller to configure network resources accordingly. Thus, a MIC and/or NMIC may interact with another SMO controller to support UE handover by sharing end device UE information. This capability can flexibly support inter or intra service provider handover.

In at least some embodiments, the SMO controller includes new rApps to support and enhance the metaverse applications and/or non-metaverse services. The SMO controller may incorporate a framework extension to include a data set pertaining to an end device on which rApps that are used to support the metaverse and/or non-metaverse services. When a UE moves out of the coverage of one service provider or SMO controller, e.g., as may occur in association with an inter and/or intra service provider handover, the SMO controller can publish the above session information to the MIC, which can pass the information along to the target MIC/SMO where the UE moves to. Such a publish-configure process may operate to ensure that delivery of a network-accessible service to a UE is continuity maintained, even during handover events.

The techniques disclosed herein relate to service design and orchestration to be implemented in a service-aware manner, e.g., according to whether a service may be a metaverse service or a non-metaverse service, according to their respective service requirements. In operation, network data may be collected from one or more network domains, including an access network domain, a transport network domain, and/or a core network domain.

The services may be implemented to identify and/or otherwise generate mappings. For example, mappings may include a meta service and physical world mapping. Alternatively, or in addition, the mappings may include a mapping of an abstraction layer that interacts with the physical world network intelligent controllers and/or MIC, e.g., to provide an association and mapping of the metaverse contents with the physical world network resources. Such mappings and abstractions may be used during a service design and orchestration phase and/or by a software defined network controller (SDNc) to instantiate the service and service/network resource chaining.

In at least some embodiments, the SDNc may have a global view of virtual communities, virtual resources, and/or physical resources, that may include one or more of wireline, wireless, RAN, core, transport, multi-access edge computing and so on. In at least some embodiments, the SDNc may work with the AIC, TIC and CIC, e.g., chaining the network resources and/or provide connectivity of physical and metaverse/non-metaverse resources to deliver services. The SDNc may also allow for dynamically changing one or more network and/or service resources and/or connections therebetween. Such changes may depend on physical network changes and/or applicable virtual communities, and/or physical location of the users' changes.

Figure 3:
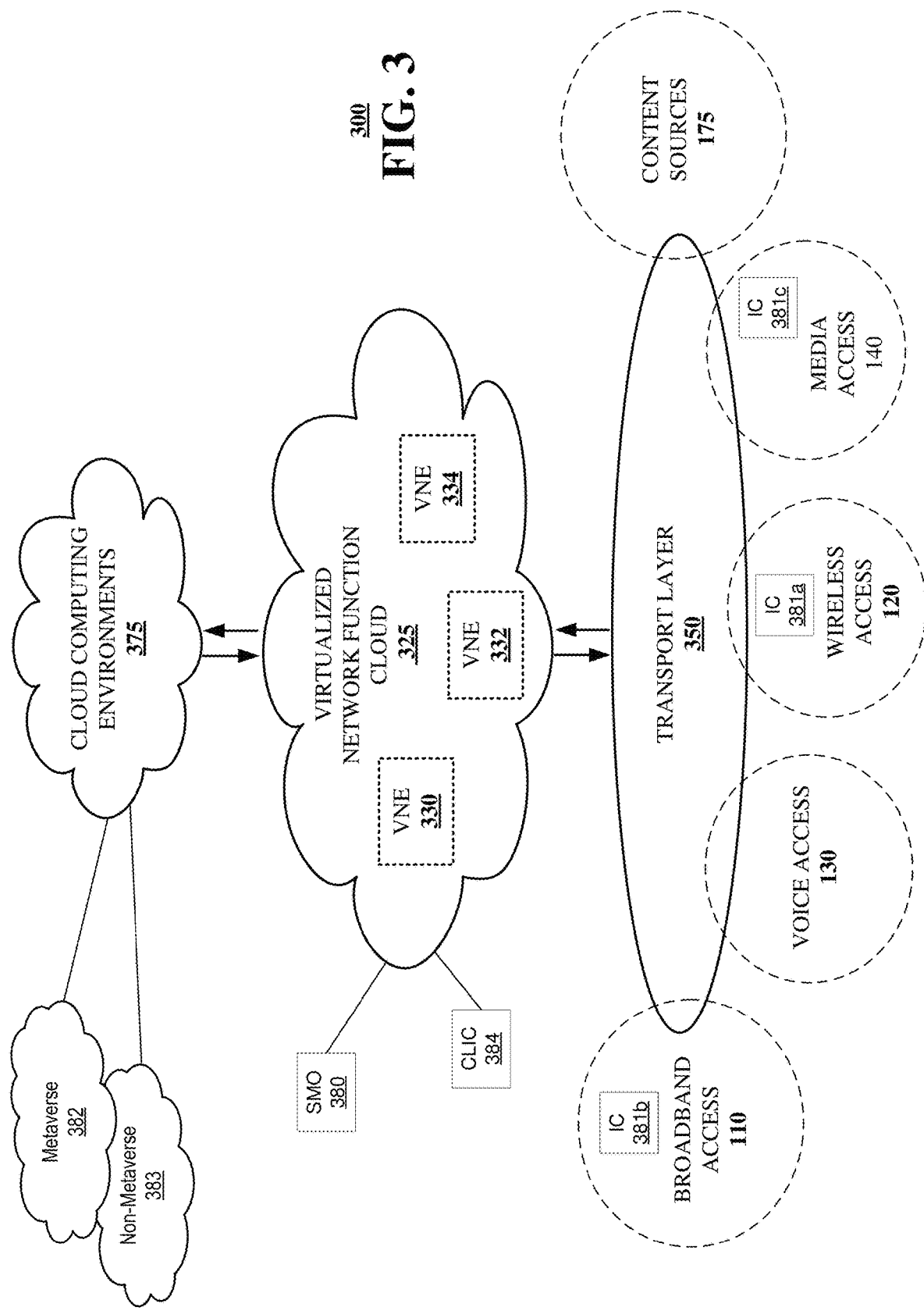
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, 220, 250 and process 280 presented in FIGS. 1, 2A, 2B, 2C, 2D, and 3. For example, virtualized communication network 300 can facilitate in whole or in part determining a requirement of a network-accessible service requested by a user along with a corresponding network policy and organizing a supporting network infrastructure according to the requirement and the policy. During a design phase, a distributed controller operating within the network domain configures time-insensitive and time sensitive network domain functions according to the network policy. The time-insensitive functions are obtained from the distributed controller and applied in a manner that selects an access domain type from among a number of different domain types. The selection is made according to an application of the time-insensitive and time sensitive network domain functions. During a runtime phase, network performance data is monitored, and the infrastructure is reconfigured responsive to the application the functions, to obtain a reconfigured network infrastructure based on the network performance data, to ensure compliance with the network policy.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide service within the broadband access domain 110, the wireless access domain 120, the voice access domain 130, the media access domain 140 and/or access to other domains, such as content source domains, e.g., a metaverse domain 382 and/or a non-metaverse domain 383 for distribution of content to any or all of the access technology domains. In some cases, a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The VNEs 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers, and other network elements. Because these elements do not typically need to forward large amounts of traffic, their workload can be distributed across a number of servers—each of which adds a portion of the capability, and which creates an elastic function with higher availability overall than its former monolithic version. These VNEs 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

The example virtualized communication network 300, includes at least one SMO controller 380 in communication with one or more intelligent domain controllers. The intelligent domain controllers may include intelligent network domain controllers and/or intelligent service domain controllers. In at least some embodiments, an intelligent network domain controller may include functionality adapted to both intelligent network domain control and intelligent service domain control. According to the illustrative example, the wireless access domain 120 includes an intelligent wireless access domain controller 381a, the broadband access domain 110 includes an intelligent broadband access domain controller 381b, and the media access domain 140 includes an intelligent media access domain controller 381c. The SMO controller 380 alone or in combination with one or more of the intelligent access domain controllers 381a, 381b, 381c, generally 381, may be adapted to host and/or support execution of time sensitive apps, e.g., xApps, and/or time-insensitive apps, e.g., rApps, as discussed above.

In at least some embodiments, one or more of intelligent access domain controllers 381 and/or the corresponding access domains 110, 120, 140 may include one or more cloud-configured resources, e.g., according to SDN practices, as may include network function virtualization (NFV). Accordingly, any one or more of the access domain controllers 381 may be provisioned, instantiated and/or otherwise operated via a cloud service. It is envisioned that in at least some instances, any initial configuration, reconfiguration and/or adjustment to the access domain 110, 120, 140 and/or the intelligent access domain controllers 381 may be implanted in whole or in party by an underlying cloud service. In such instances, one or more of the rApps and/or xApps may be adapted to cooperate with the underlying cloud service to provide feedback and/or to direct any configuration and/or reconfiguration activities.

In at least some embodiments, e.g., those in which at least some of the access networks 110, 120, 140 and/or the intelligent access domain controllers 381 utilize a cloud service, the virtualized communication network 300 may include an intelligent cloud domain controller 384. The cloud domain controller 384 may host and/or otherwise implement one or more time sensitive applications, e.g., xApps, as may be adapted to manage, control and/or optimize an underlying cloud infrastructure, in cooperation with the SMO controller 380. The SMO, in turn, may host and/or otherwise implement one or more time-insensitive applications, e.g., rApps, as may be adapted to facilitate management, control and/or optimization of the underlying cloud infrastructure in cooperation with the intelligent cloud domain controllers 384.

It is further envisioned that in at least some embodiments, one or more of the intelligent cloud domain controllers 384 may be adapted to modify and/or otherwise tailor their respective domain controller operations according to a type and/or a category of a service, which the respective domains are directed toward providing. According to the illustrative examples discussed herein, network-accessible services may be broadly categorized as metaverse services that deal in at least some capacity with a metaverse environment and/or metaverse application, and/or metaverse user equipment, and non-metaverse services that do not deal with such environments, applications and/or user equipment. The example virtualized communication network 300 includes a metaverse cloud environment 382 and a non-metaverse cloud environment 383. In at least some embodiments, one or more of the time-insensitive applications and/or the time sensitive applications, may be adapted to function according to the underlying service categorization(s). Such specialized functioning may be referred to generally as being tailored and/or oriented and/or otherwise configured according to an awareness of the network-accessible services being accessed by user equipment via the configured network resources.

Figure 4:
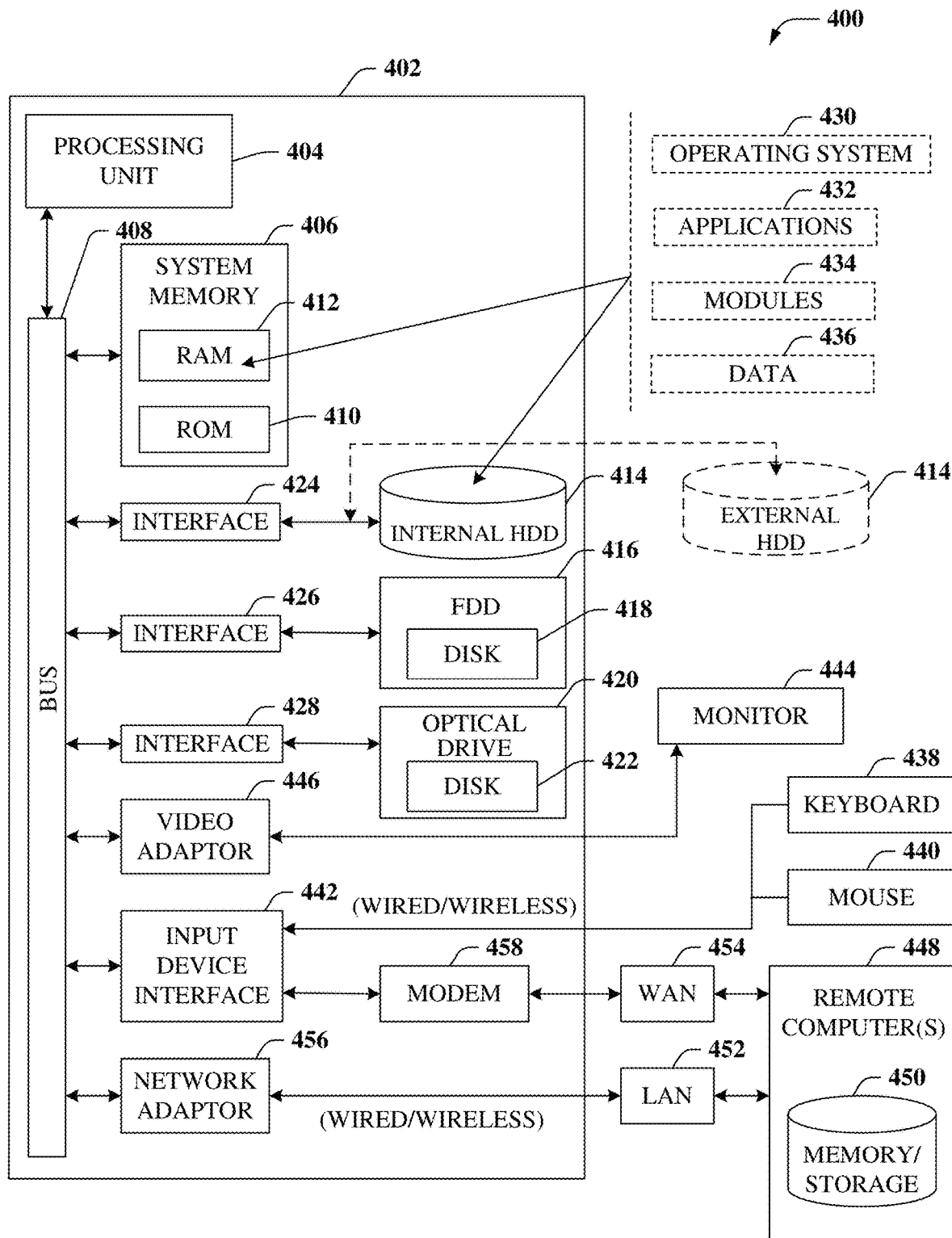
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining a requirement of a network-accessible service requested by a user along with a corresponding network policy and organizing a supporting network infrastructure according to the requirement and the policy. During a design phase, a distributed controller operating within the network domain configures time-insensitive and time sensitive network domain functions according to the network policy. The time-insensitive functions are obtained from the distributed controller and applied in a manner that selects an access domain type from among a number of different domain types. The selection is made according to an application of the time-insensitive and time sensitive network domain functions. During a runtime phase, network performance data is monitored, and the infrastructure is reconfigured responsive to the application the functions, to obtain a reconfigured network infrastructure based on the network performance data, to ensure compliance with the network policy.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared, and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies.

Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
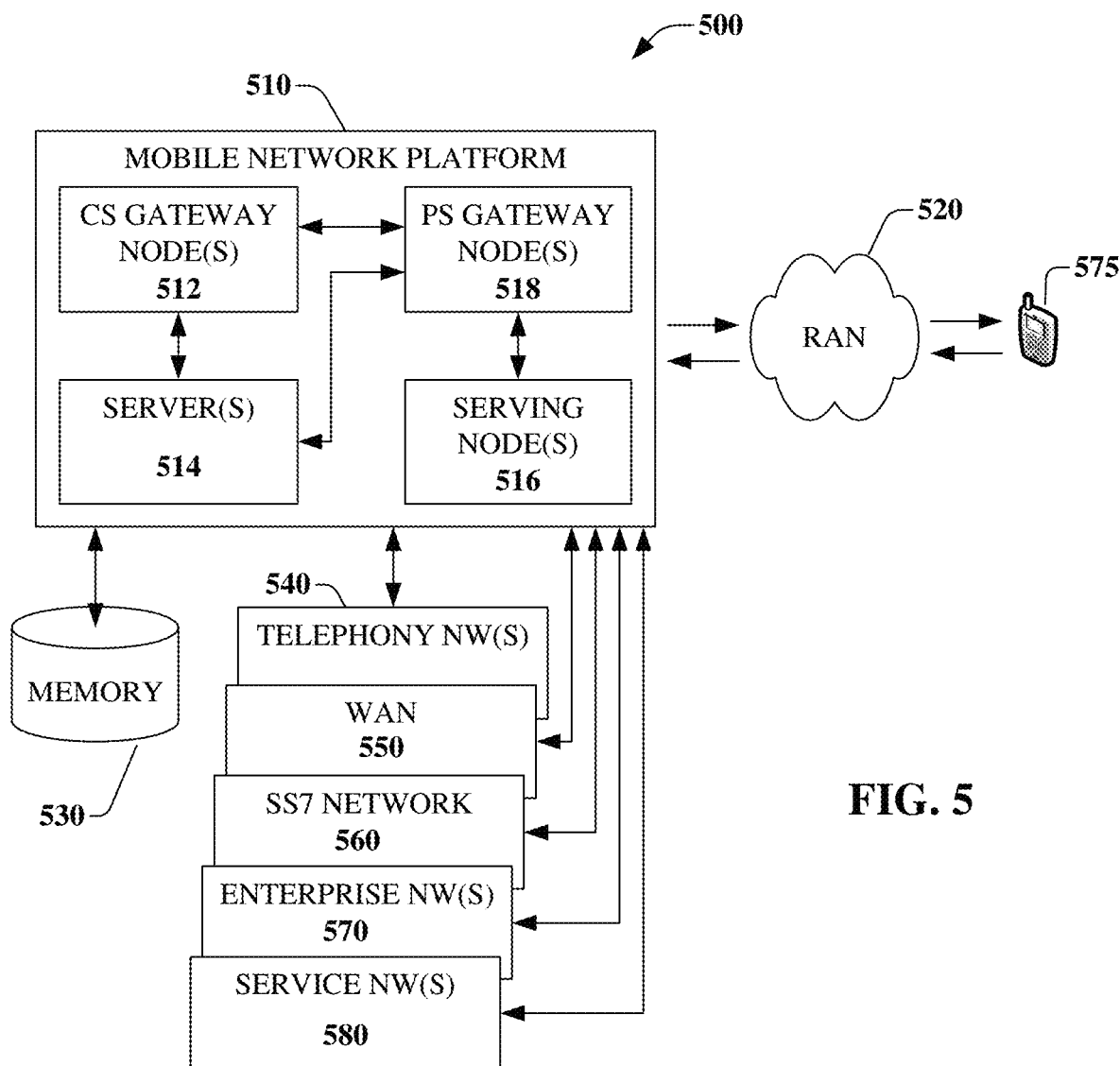
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining a requirement of a network-accessible service requested by a user along with a corresponding network policy and organizing a supporting network infrastructure according to the requirement and the policy. During a design phase, a distributed controller operating within the network domain configures time-insensitive and time sensitive network domain functions according to the network policy. The time-insensitive functions are obtained from the distributed controller and applied in a manner that selects an access domain type from among a number of different domain types. The selection is made according to an application of the time-insensitive and time sensitive network domain functions. During a runtime phase, network performance data is monitored, and the infrastructure is reconfigured responsive to the application the functions, to obtain a reconfigured network infrastructure based on the network performance data, to ensure compliance with the network policy. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
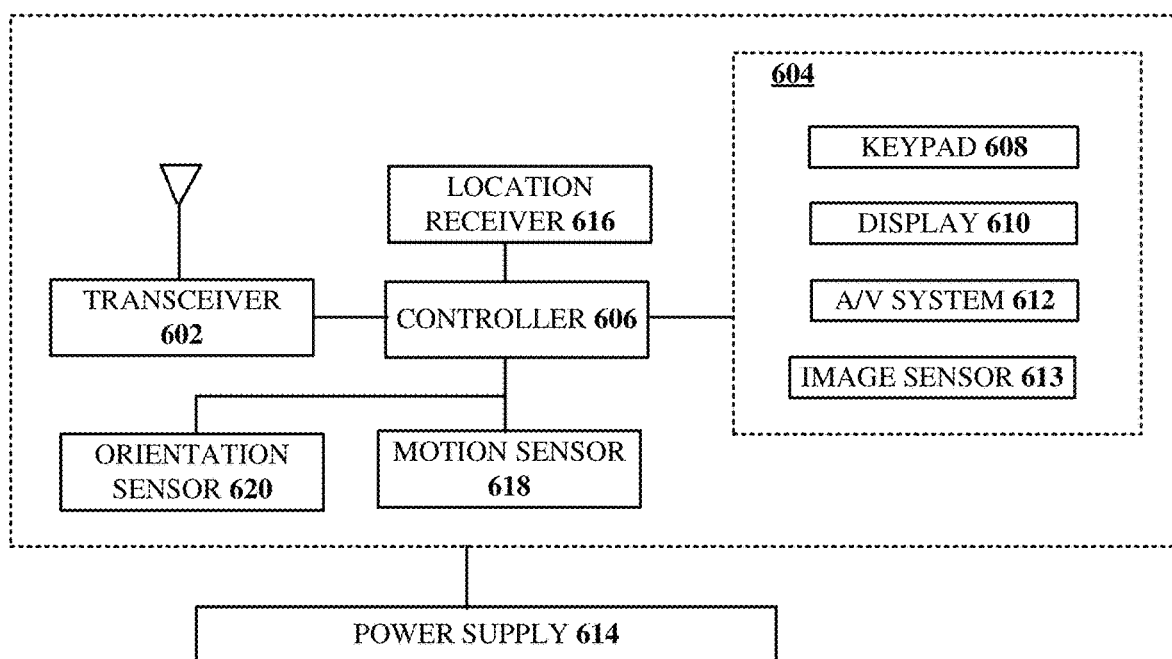
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determining a requirement of a network-accessible service requested by a user along with a corresponding network policy and organizing a supporting network infrastructure according to the requirement and the policy. During a design phase, a distributed controller operating within the network domain configures time-insensitive and time sensitive network domain functions according to the network policy. The time-insensitive functions are obtained from the distributed controller and applied in a manner that selects an access domain type from among a number of different domain types. The selection is made according to an application of the time-insensitive and time sensitive network domain functions. During a runtime phase, network performance data is monitored, and the infrastructure is reconfigured responsive to the application the functions, to obtain a reconfigured network infrastructure based on the network performance data, to ensure compliance with the network policy.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive, or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM, or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=confidence(class)$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches, and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature, or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system, comprising:
a plurality of distributed domain controllers adapted to provide time sensitive control of network infrastructure of a plurality of distributed network domains to facilitate delivery of a plurality of network-accessible services to equipment of a plurality of end users;
a service manager in communication with the plurality of distributed domain controllers, the service manager comprising:
a processing system including a processor; and
a memory that stores executable instructions that, when executed by the processing system, facilitate performance of operations, the operations comprising:
identifying a service requirement of a network-accessible service of the plurality of network-accessible services, requested by equipment of an end user of the plurality of end users;
identifying a network policy according to the network-accessible service;
coordinating a configuration of a network infrastructure of a first network domain adapted to serve the network-accessible service to the equipment of the end user according to the service requirement and the network policy, wherein a first distributed domain controller of the plurality of distributed domain controllers operating within the first network domain configures a first plurality of time-insensitive network domain functions according to the network policy and a first plurality of time sensitive network domain functions according to the network policy;
receiving the first plurality of time-insensitive network domain functions from the first distributed domain controller;
executing the first plurality of time-insensitive network domain functions, wherein the first distributed domain controller executing the first plurality of time sensitive network domain functions at a network edge of the first network domain selects an access domain type of a plurality of different access domain types to obtain a first selected access domain type according to the executing the first plurality of time-insensitive network domain functions and the executing the first plurality of time sensitive network domain functions; and
collecting network performance data associated with a delivery of the network-accessible service to the equipment of the end user via the network infrastructure of the first network domain including the first selected access domain type, wherein the network infrastructure of the first network domain is reconfigured responsive to the executing the first plurality of time-insensitive network domain functions and the executing the first plurality of time sensitive network domain functions, to obtain a reconfigured network infrastructure of the first network domain, based on the network performance data, to ensure compliance with the network policy.

2. The system of claim 1, wherein the operations further comprise:
categorizing the network-accessible service according to one of a metaverse service category or a non-metaverse service category to obtain a service categorization.

3. The system of claim 2, wherein the first plurality of time-insensitive network domain functions comprising a time-insensitive, metaverse application program and a time-insensitive, non-metaverse application program, and the first plurality of time sensitive network domain functions comprising a time sensitive, metaverse application program and a time sensitive, non-metaverse application program.

4. The system of claim 2, wherein responsive to the service categorization comprising the metaverse service category, the operations further comprising:
determining a data set pertaining to the equipment of the end user;
identifying a plurality of virtual items occurring with an instance of a metaverse environment of a metaverse service; and
mapping an item of the plurality of virtual items to the equipment of the end user, wherein the executing the first plurality of time sensitive network domain functions is based on the mapping.

5. The system of claim 1, wherein the coordinating the configuration of network infrastructure comprises designing and orchestrating a plurality of network elements to obtain the configuration of network infrastructure.

6. The system of claim 5, wherein the plurality of network elements comprises virtual network elements of a cloud service.

7. The system of claim 1, wherein the operations further comprise:
training a machine learning model to obtain a trained model according to the executing the first plurality of time-insensitive network domain functions; and
providing the trained model to the first distributed domain controller of the plurality of distributed domain controllers, wherein the first distributed domain controller of the plurality of distributed domain controllers applies the trained model to the first plurality of time sensitive network domain functions.

8. The system of claim 7, wherein the network policy comprises maintaining a threshold level of the service requirement of the network-accessible service of the plurality of network-accessible services.

9. The system of claim 8, wherein the reconfigured network infrastructure of the first network domain comprises a second selected access domain type of the plurality of different access domain types.

10. The system of claim 9, wherein the plurality of different access domain types comprises more than one of a wireless link, a radio access network of a mobile cellular service, a satellite communications link, a microwave link, a free-space optical link, or a wired link.

11. The system of claim 1, wherein the first distributed domain controller executing the first plurality of time sensitive network domain functions at a network edge of the first network domain selects a first core network domain type of a plurality of different core network domain types, and wherein the reconfigured network infrastructure of the first network domain comprises a second selected core network domain type of the plurality of different access domain types.

12. A method, comprising:
identifying, by a processing system including a processor, a service requirement of a network-accessible service of a plurality of network-accessible services, requested by equipment of an end user;
identifying, by the processing system, a network policy according to the network-accessible service;
organizing, by the processing system, a network infrastructure of a first network domain adapted to serve the network-accessible service to the equipment of the end user according to the service requirement and the network policy, wherein a first distributed domain controller of a plurality of distributed domain controllers operating within the first network domain configures a first plurality of time-insensitive network domain functions according to the network policy and a first plurality of time sensitive network domain functions according to the network policy;
obtaining, by the processing system, the first plurality of time-insensitive network domain functions from the first distributed domain controller;
hosting, by the processing system, the first plurality of time-insensitive network domain functions, wherein the first distributed domain controller hosting the first plurality of time sensitive network domain functions at a network edge of the first network domain selects an access domain type of a plurality of different access domain types to obtain a first selected access domain type according to a running of the first plurality of time-insensitive network domain functions and a running of the first plurality of time sensitive network domain functions; and
monitoring, by the processing system, network performance data associated with a delivery of the network-accessible service to the equipment of the end user via the network infrastructure of the first network domain including the first selected access domain type, wherein the network infrastructure of the first network domain is reconfigured responsive to the running of the first plurality of time-insensitive network domain functions and the running of the first plurality of time sensitive network domain functions, to obtain a reconfigured network infrastructure of the first network domain, based on the network performance data, to ensure compliance with the network policy.

13. The method of claim 12, further comprising:
categorizing, by the processing system, the network-accessible service according to one of a metaverse service category or a non-metaverse service category to obtain a service categorization.

14. The method of claim 13, wherein the first plurality of time-insensitive network domain functions comprising a time-insensitive, metaverse application program and a time-insensitive, non-metaverse application program, and the first plurality of time sensitive network domain functions comprising a time sensitive, metaverse application program and a time sensitive, non-metaverse application program.

15. The method of claim 13, wherein responsive to the service categorization comprising the metaverse service category, the operations further comprising:
determining, by the processing system, a data set pertaining to the equipment of the end user;
identifying, by the processing system, a plurality of virtual items occurring with an instance of a metaverse environment of a metaverse service; and
mapping, by the processing system, an item of the plurality of virtual items to the equipment of the end user, wherein the running the first plurality of time sensitive network domain functions is based on the mapping.

16. The method of claim 12, wherein the operations further comprise:
training, by the processing system, a machine learning model to obtain a trained model according to the running the first plurality of time-insensitive network domain functions; and
providing, by the processing system, the trained model to the first distributed domain controller of the plurality of distributed domain controllers, wherein the first distributed domain controller of the plurality of distributed domain controllers applies the trained model to the first plurality of time sensitive network domain functions.

17. The method of claim 16, wherein the network policy comprises maintaining a threshold level of the service requirement of the network-accessible service of the plurality of network-accessible services.

18. A non-transitory, machine-readable medium, comprising executable instructions that, when executed by a processing system including a processor, facilitate performance of operations, the operations comprising:
determining a service requirement of a network-accessible service of a plurality of network-accessible services, requested by equipment of an end user;
determining a network policy according to the network-accessible service;
organizing a network infrastructure of a first network domain adapted to serve the network-accessible service to the equipment of the end user according to the service requirement and the network policy, wherein a first distributed domain controller of a plurality of distributed domain controllers operating within the first network domain configures a first plurality of time-insensitive network domain functions according to the network policy and a first plurality of time sensitive network domain functions according to the network policy;
obtaining the first plurality of time-insensitive network domain functions from the first distributed domain controller;

applying the first plurality of time-insensitive network domain functions, wherein the first distributed domain controller applying the first plurality of time sensitive network domain functions selects an access domain type of a plurality of different access domain types to obtain a first selected access domain type according to an application of the first plurality of time-insensitive network domain functions and an application of the first plurality of time sensitive network domain functions; and obtaining network performance data associated with a delivery of the network-accessible service to the equipment of the end user via the network infrastructure of the first network domain including the first selected access domain type, wherein the network infrastructure of the first network domain is reconfigured responsive to the application of the first plurality of time-insensitive network domain functions and the application of the first plurality of time sensitive network domain functions, to obtain a reconfigured network infrastructure of the first network domain, based on the network performance data, to ensure compliance with the network policy.

19. The non-transitory, machine-readable medium of claim 18, wherein the operations further comprise:
categorizing, by the processing system, the network-accessible service according to one of a metaverse service category or a non-metaverse service category to obtain a service categorization.

20. The non-transitory, machine-readable medium of claim 19, wherein the first plurality of time-insensitive network domain functions comprising a time-insensitive, metaverse application program and a time-insensitive, non-metaverse application program, and the first plurality of time sensitive network domain functions comprising a time sensitive, metaverse application program and a time sensitive, non-metaverse application program.

* * * * *